(12) United States Patent
Kim et al.

(10) Patent No.: US 11,899,332 B2
(45) Date of Patent: Feb. 13, 2024

(54) DISPLAY DEVICE

(71) Applicant: SOLUM CO., LTD, Yongin-si (KR)

(72) Inventors: Yong Joo Kim, Suwon-si (KR); Yong Bum Lee, Suwon-si (KR); Tae Ha Lee, Yongin-si (KR)

(73) Assignee: SOLUM CO., LTD

( * ) Notice: Subject to any disclaimer, the term of this patent is extended or adjusted under 35 U.S.C. 154(b) by 148 days.

(21) Appl. No.: 17/064,867

(22) Filed: Oct. 7, 2020

(65) Prior Publication Data

US 2021/0325756 A1 Oct. 21, 2021

(30) Foreign Application Priority Data

Apr. 17, 2020 (KR) .................. 10-2020-0046822

(51) Int. Cl.
*G02F 1/167* (2019.01)
*G02F 1/1679* (2019.01)
*G09G 3/20* (2006.01)

(52) U.S. Cl.
CPC ............ *G02F 1/167* (2013.01); *G02F 1/1679* (2019.01); *G09G 3/20* (2013.01); *G09G 2300/0426* (2013.01)

(58) Field of Classification Search
CPC ......... G02F 1/167; G02F 1/1679; G09G 3/20; G09G 2300/0426
See application file for complete search history.

(56) References Cited

U.S. PATENT DOCUMENTS

| 8,390,301 | B2 * | 3/2013 | Danner | G02B 26/026 |
| | | | | 324/76.36 |
| 10,224,289 | B2 * | 3/2019 | Kim | H01L 51/0012 |
| 10,353,426 | B2 * | 7/2019 | Pantel | G06F 1/1686 |
| 11,069,273 | B2 * | 7/2021 | Bae | H05K 5/04 |
| 2007/0268442 | A1 * | 11/2007 | Oh | G02F 1/136204 |
| | | | | 349/149 |
| 2010/0201900 | A1 | 8/2010 | Lee et al. | |
| 2013/0082984 | A1 * | 4/2013 | Drzaic | G09G 3/20 |
| | | | | 345/204 |

(Continued)

FOREIGN PATENT DOCUMENTS

CN 102338945 A * 2/2012
CN 108761885 11/2018

(Continued)

OTHER PUBLICATIONS

European Search Report; International Application No. 20200809.0 dated Dec. 8, 2020.

*Primary Examiner* — Chanh D Nguyen
*Assistant Examiner* — Ngan T. Pham-Lu
(74) *Attorney, Agent, or Firm* — Perman & Green, LLP

(57) ABSTRACT

A display device includes a substrate, a common electrode layer on the substrate where the common electrode layer includes a first common pad protruding in a second direction from a first reference side surface extending in a first direction and the second direction intersects the first direction, a driving layer between the substrate and the common electrode layer, a display layer between the driving layer and the common electrode layer, a first conductive via apart from the driving layer and between the substrate and the first common pad, and a driving chip at an opposite side of the first conductive via with reference to the driving layer.

14 Claims, 22 Drawing Sheets

(56) References Cited

U.S. PATENT DOCUMENTS

| | | | |
|---|---|---|---|
| 2014/0211428 A1 | 7/2014 | Sato | |
| 2019/0034003 A1* | 1/2019 | Zeng | G06F 3/0443 |
| 2019/0294281 A1* | 9/2019 | Kim | G09G 3/22 |
| 2019/0391457 A1* | 12/2019 | Bao | G02F 1/1679 |
| 2019/0392767 A1* | 12/2019 | Kim | G09G 3/20 |

FOREIGN PATENT DOCUMENTS

| | | | |
|---|---|---|---|
| CN | 208654505 U | * | 3/2019 |
| KR | 101254029 | | 4/2013 |
| KR | 20190012926 | | 2/2019 |
| WO | 2011125268 | | 10/2011 |

* cited by examiner

DISPLAY DEVICE

CROSS-REFERENCE TO RELATED APPLICATION

This application claims the benefit of Korean Patent Application No. 10-2020-0046822, filed on Apr. 17, 2020, in the Korean Intellectual Property Office, the disclosure of which is incorporated herein in its entirety by reference.

BACKGROUND

1. Field

The present disclosure relates to a display device.

2. Brief Description of Related Developments

Examples of electronic paper include a twist ball display using a semi-spherical twist ball charged with static charges, an electrophoretic display using electrophoresis and a microcapsule, an in-plane type electrophoretic display, and a cholesterol display using a cholesterol liquid crystal. An electrophoretic display having the highest degree of commercialization uses an electrophoretic phenomenon that charged particles are moved by an electric field applied in a state in which the charged particles are distributed in a dielectric fluid.

A representative electrophoretic display uses a microcapsule charged with a dielectric fluid containing a plurality of types of ink corpuscles having different electrification characteristics and colors. When such micro-capsules are mixed with a binder and located between upper and lower electrodes, and an electric field is applied to the micro-capsules, ink corpuscles charged according to the electric field applied for each pixel are moved to the surface, thereby developing colors.

The in-plane type electrophoretic display has a partition structure called Micro-Cup®. A micro-cup structure is formed by shaping a photosensitive polymer layer by a roller having a patterned surface and then curing the shaped photosensitive polymer layer by ultraviolet rays. Although a micro-cup structure may have various shapes as a top view, the micro-cup structure commonly has a hexagonal honeycomb structure. The in-plane type electrophoretic display is manufactured by spraying and filling an electrophoretic dispersion solution in which several types of charged pigment particles are dispersed in a dielectric fluid into a micro-cup structure and sealing entrances of the micro-cups by a sealing layer formed by a roller manner.

SUMMARY

A problem to be solved is to provide a display device having a miniaturized non-display area.

Another problem to be solved is to provide a display device including an additional element.

However, the problems to be solved are not limited to the disclosure.

Additional aspects will be set forth in part in the description which follows and, in part, will be apparent from the description, or may be learned by practice of the presented embodiments of the disclosure.

According to one aspect of the disclosure, there is provided a display device including: a substrate; a common electrode layer on the substrate, the common electrode layer including a first common pad protruding in a second direction from a first reference side surface extending in a first direction, the second direction intersecting with the first direction; a driving layer between the substrate and the common electrode layer; a display layer between the driving layer and the common electrode layer; a first conductive via apart from the driving layer and between the substrate and the first common pad; and a driving chip at an opposite side of the first conductive via with reference to the driving layer.

The display device may further include a second conductive via apart from the first conductive via in the first direction, wherein the common electrode layer further includes a second common pad on the second conductive via, and the second common pad protrudes from the first reference side surface.

The first and second common pads may be respectively on both end portions of the first reference side surface arranged at opposite sides in the first direction.

The display device may further include a protective layer on the common electrode layer, wherein the protective layer includes: a first protective pad on the first common pad; and a second protective pad on the second common pad, the first and second protective pads protrude from a second reference side surface of the protective layer extending in the first direction, and the protective layer, the first protective pad, and the second protective pad include an electrical insulating material.

When viewing in a third direction orthogonal to an upper surface of the substrate, the first and second common pads may be inside the first and second protective pads, respectively.

The substrate may include: a first protruding substrate at the opposite side of the first protective pad with reference to the first conductive via; and a second protruding substrate at the opposite side of the second protective pad with reference to the second conductive via, wherein the first and second protruding substrates protrude from a third reference side surface of the substrate extending in the first direction.

The display device may further include a sealing membrane extending on the substrate along an edge of the protective layer, an edge of the first protective pad, and an edge of the second protective pad.

A side surface of the sealing membrane may extend in the third direction orthogonal to the upper surface of the substrate.

When viewing in the third direction orthogonal to the upper surface of the substrate, a distance between the side surface of the sealing membrane and the protective layer may be gradually less from the upper surface of the substrate.

The sealing membrane may form a single layer with the protective layer, the first protective pad, and the second protective pad.

The display device may further include: a printed circuit board at an opposite side of the display layer with reference to the substrate; and an additional element on the printed circuit board, wherein the additional element includes at least one of a light-emitting element and an antenna element, and when viewing in the third direction orthogonal to the upper surface of the substrate, the additional element is between the first and second protective pads.

The substrate may include: a first protruding substrate between the first conductive via and the printed circuit board; and a second protruding substrate between the second conductive via and the printed circuit board, wherein the first and second protruding substrates protrude from the third reference side surface of the substrate extending in the first direction, and the additional element is exposed between the first and second protruding substrates.

The first common pad may be on any one of both end portions of the first reference side surface arranged at opposite sides in the first direction.

The first common pad may be in a region between both end portions of the first reference side surface arranged at opposite sides in the first direction.

The display device may further include a housing, wherein the substrate, the driving layer, the display layer, the protective layer, the first protective pad, the second protective pad, the first conductive via, the second conductive via, and the driving chip are arranged in the housing, and the housing includes a first window overlapping the display layer in the third direction orthogonal to the upper surface of the substrate.

The display device may further include: a printed circuit board at an opposite side of the display layer with reference to the substrate; and a light-emitting element on the printed circuit board, wherein the printed circuit board and the light-emitting element are arranged in the housing, and the housing further includes a second window overlapping the light-emitting element in the third direction.

According to another aspect of the disclosure, there is provided a display device including: a substrate; an electronic paper layer on the substrate; and a driving chip configured to control the electronic paper layer, wherein the driving chip and the electronic paper layer are arranged in a first direction parallel to an upper surface of the substrate, the electronic paper layer includes first and second protruding parts protruding from a reference side surface at an opposite side of the driving chip, and the driving chip controls electrophoretic particles inside the electronic paper layer by generating an electric field inside the electronic paper layer.

The display device may further include: a first conductive via between the first protruding part and the substrate; and a second conductive via between the second protruding part and the substrate, wherein the first and second conductive vias apply a common voltage to the electronic paper layer.

The display device may further include: a printed circuit board at an opposite side of the electronic paper layer with reference to the substrate; and an additional element on the printed circuit board, wherein the additional element includes at least one of a light-emitting element and an antenna element, and when viewing in a second direction orthogonal to the upper surface of the substrate, the additional element is between the first and second protruding parts.

The display device may further include a housing encompassing the substrate, the electronic paper layer, the driving chip, the printed circuit board, and the additional element, wherein the electronic paper layer includes a display area in which the electrophoretic particles are provided and a non-display area around the display area, and the housing includes a first window through which the display area of the electronic paper layer is exposed and a second window overlapping the additional element in the second direction.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
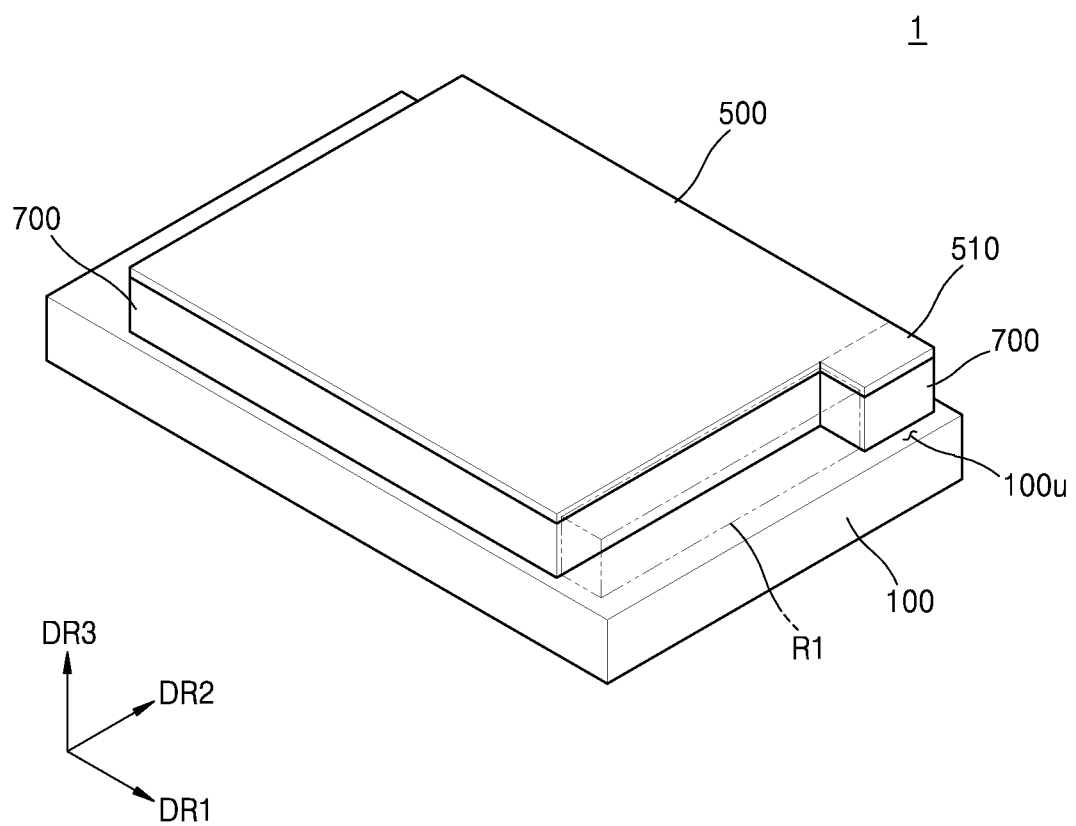
FIG. 1 is a perspective view of a display device according to an example embodiment of the disclosure.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

Hereinafter, embodiments of the present disclosure will be described in detail with reference to the accompanying drawings. Like reference numerals in the drawings denote like elements, and in the drawings, the thicknesses or sizes of components may be exaggerated for convenience and clarity of description. The embodiments described below are only illustrative, and various changes in form and details may be made therein.

Hereinafter, when it is described that a certain component is "on an upper part of" or "on" another component, the certain component may be directly on another component, or a third component may be interposed therebetween.

An expression in the singular includes an expression in the plural unless they are clearly different from each other in context. In addition, when a component "includes" an element, unless there is another opposite description thereto, it should be understood that the component does not exclude another element but may further include another element.

Figure 2:
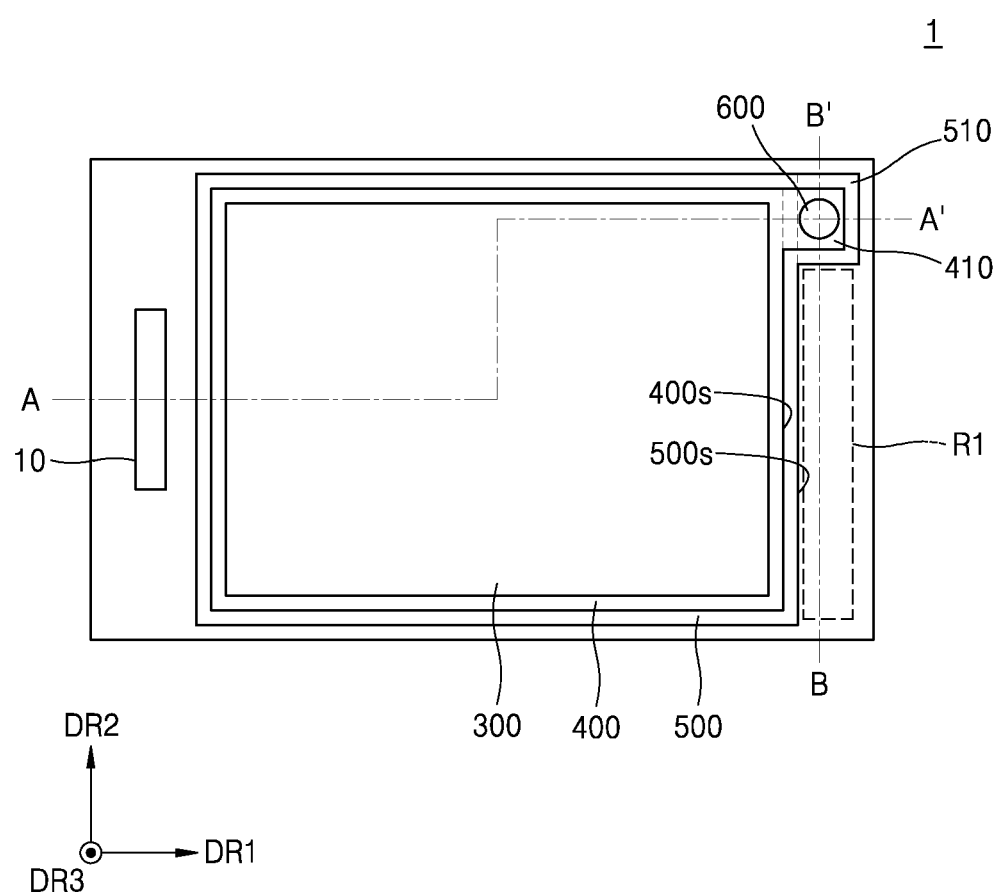
FIG. 2 is a top view of the display device of FIG. 1.
Figure 3:
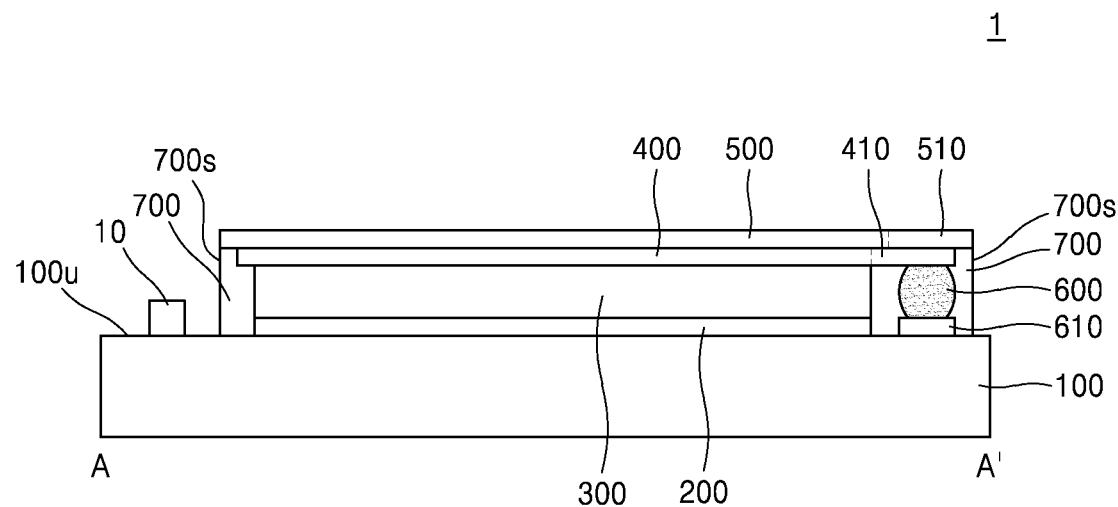
FIG. 3 is a cross-sectional view taken along line A-A' of FIG. 2.
Figure 4:
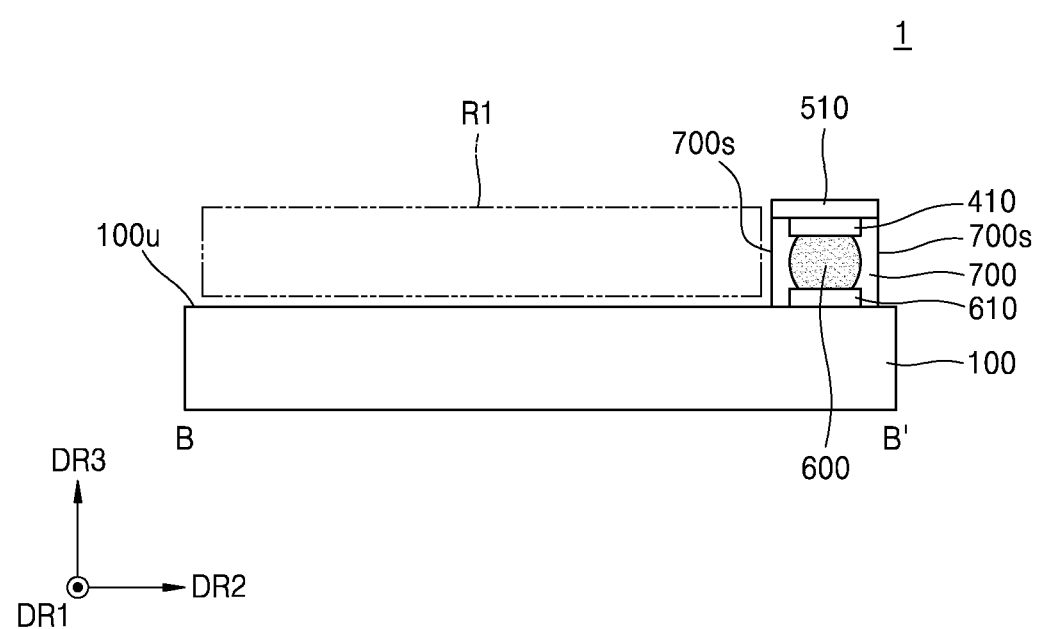
FIG. 4 is a cross-sectional view taken along line B-B' of FIG. 2.

FIG. 1 is a perspective view of a display device according to an example embodiment of the disclosure. FIG. 2 is a top view of the display device of FIG. 1. FIG. 3 is a cross-sectional view taken along line A-A' of FIG. 2. FIG. 4 is a cross-sectional view taken along line B-B' of FIG. 2.

Referring to FIGS. 1 to 4, a display device 1 may be provided. The display device 1 may include a substrate 100, a driving chip 10, a driving layer 200, a display layer 300, a common electrode layer 400, a common pad 410, a conductive via 600, a lower pad 610, a protective layer 500, a protective pad 510, and a sealing membrane 700. The driving layer 200, the display layer 300, the common electrode layer 400, the common pad 410, the protective layer 500, and the protective pad 510 may be referred to as an electronic paper layer. The substrate 100 may include a transparent electrical insulating material. For example, the substrate 100 may include a glass substrate or a plastic substrate.

The driving chip 10 may be on the substrate 100. The driving chip 10 may be electrically connected to the driving layer 200 and the common electrode layer 400. For example, the driving chip 10 may be electrically connected to the driving layer 200 and the common electrode layer 400 by wirings (not shown) on the substrate 100. The driving chip 10 may control driving elements inside the driving layer 200 and apply a common voltage to the common electrode layer 400.

The driving layer 200 may be on the substrate 100. The driving layer 200 and the driving chip 10 may be arranged in a first direction DR1 parallel to an upper surface 100u of the substrate 100. For example, the driving layer 200 may be apart from the driving chip 10 in the first direction DR1. The driving layer 200 may include driving elements, first conductive lines, and second conductive lines. The driving elements may define pixels, respectively. For example, the driving elements may be thin-film transistors. The driving elements may respectively have pixel electrodes facing the display layer 300.

The first conductive lines may extend in the first direction DR1 parallel to the upper surface 100u of the substrate 100. The second conductive lines may extend in a second direction DR2 parallel to the upper surface 100u of the substrate 100 and intersecting with the first direction DR1. The driving elements may be respectively arranged in regions in which the first conductive lines intersect with the second conductive lines. The first conductive lines and the second conductive lines may receive an electrical signal applied from the driving chip 10. A driving voltage may be applied to a pixel electrode of a driving element in a region in which a first conductive line and a second conductive line to which the electrical signal is applied intersect with each other.

The display layer 300 may be on the driving layer 200. The display layer 300 may cover the driving layer 200. For example, a bonding layer may be between the display layer 300 and the driving layer 200. The display layer 300 may include electrophoretic particles having different electrical characteristics and colors. For example, some of the electrophoretic particles may have positive charges and a black color, and the other some of the electrophoretic particles may have negative charges and a white color. For example, the electrophoretic particles having positive charges and a black color may be carbon black particles, and the electrophoretic particles having negative charges and a white color may be titanium oxide ($TiO_2$) or silica ($SiO_2$) particles. The electrophoretic particles may be provided to the inside of a micro-capsule or a partition structure together with a transparent dielectric fluid. The contents to be output by the display device 1 may depend on locations of the electrophoretic particles. According to an embodiment of the disclosure, the electrophoretic particles may include white particles, black particles, and color particles. The white particles and the black particles may be substantially the same as those described above. The color particles may have different colors from the black and white colors. For example, the color particles may have a cyan color, a magenta color, a yellow color, a red color, a green color, or a blue color. The color particles may be charged positively or negatively. For example, a net charge amount of the color particles may be less than a net charge amount of the white particles and a net charge amount of the black particles. The common electrode layer 400 may be on the display layer 300. The common electrode layer 400 may face the driving layer 200 with the display layer 300 therebetween. The common electrode layer 400 may include a transparent conductive material. For example, the common electrode layer 400 may include indium tin oxide (ITO). The common voltage different from the driving voltage may be applied to the common electrode layer 400. An electric field may be formed between the common electrode layer 400 and a pixel electrode. Locations of the electrophoretic particles may be controlled by an electric field between the common electrode layer 400 and the pixel electrodes. In other words, the contents to be output by the display device 1 may be determined by an electric field between the common electrode layer 400 controlled by the driving chip 10 and the pixel electrodes. Although it is shown that the common electrode layer 400 includes the display layer 300 when viewing in a third direction DR3 orthogonal to the upper surface 100u of the substrate 100, the present embodiment is not limited thereto. According to another embodiment of the disclosure, the common electrode layer 400 may fully overlap the display layer 300 when viewing in the third direction DR3.

The common pad 410 may be on a first reference side surface 400s of the common electrode layer 400. The first reference side surface 400s may be a side surface of the common electrode layer 400 oriented in the first direction DR1. When viewing in the third direction DR3, a distance between the first reference side surface 400s and the substrate 100 may be approximately 5 mm to 7 mm. The common pad 410 may be on one end portion of the first reference side surface 400s. The common pad 410 may protrude from the first reference side surface 400s. For example, the common pad 410 may extend on the first reference side surface 400s in the first direction DR1. The common pad 410 may include an electrically conductive material. For example, the common pad 410 may include a metal (e.g., aluminum (Al) or copper (Cu)) or a transparent electrode material (e.g., ITO). The common pad 410 may be electrically connected to the common electrode layer 400. For example, the common pad 410 may be in direct contact with the common electrode layer 400. For example, the common pad 410 may form a single layer with the common electrode layer 400. In other words, the common pad 410 and the common electrode layer 400 may be connected to each other without a boundary surface therebetween. For example, the common pad 410 and the common electrode layer 400 may be different layers. In other words, the common pad 410 and the common electrode layer 400 may be connected to each other with a boundary surface therebetween.

The lower pad 610 may be between the common pad 410 and the substrate 100. For example, the lower pad 610 may be in direct contact with the upper surface 100u of the substrate 100. The lower pad 610 may be electrically connected to the driving chip 10 by a conductive wiring extending along the upper surface 100u of the substrate 100. The lower pad 610 may include an electrical material. For example, the lower pad 610 may include Al or Cu.

The conductive via 600 may be between the lower pad 610 and the common pad 410. The conductive via 600 may be electrically connected to the lower pad 610 and the common pad 410. For example, the conductive via 600 may be in direct contact with the lower pad 610 and the common pad 410. The conductive via 600 may apply the common voltage to the common pad 410. For example, the conductive via 600 may include a silver paste. The common voltage may be applied to the common electrode layer 400 by the common pad 410.

The protective layer 500 may be on the common electrode layer 400. The protective layer 500 may cover the common electrode layer 400. The protective layer 500 may protect layers under the protective layer 500 so that the layers under the protective layer 500 are not damaged. The protective layer 500 may include a transparent electrical insulating material. For example, the protective layer 500 may include a polyethylene terephthalate (PET) film. For example, an antiglare film may be on an upper surface or under a lower surface of the protective layer 500. Although it is shown that the protective layer 500 includes the common electrode layer 400 when viewing in the third direction DR3, the present embodiment is not limited thereto. According to another embodiment of the disclosure, the protective layer 500 may fully overlap the common electrode layer 400 when viewing in the third direction DR3.

The protective pad 510 may be on the common pad 410. The protective pad 510 may cover the common pad 410. The protective pad 510 may be on a second reference side surface 500s of the protective layer 500. The second reference side surface 500s may be a side surface of the protective layer 500 oriented in the first direction DR1. The second reference side surface 500s may be a side surface of the protective layer 500 immediately adjacent to the first reference side surface 400s. The protective pad 510 may protrude from the second reference side surface 500s. For example, the protective layer 500 may extend on the second reference side surface 500s in the first direction DR1. The protective pad 510 may include an electrical insulating material. For example, the protective pad 510 may include a PET film. For example, the protective pad 510 may form a single layer with the protective layer 500. In other words, the protective pad 510 and the protective layer 500 may be connected to each other without a boundary surface therebetween. For example, the protective pad 510 may be a different layer from the protective layer 500. In other words, the protective pad 510 and the protective layer 500 may be connected to each other with a boundary surface therebetween. Although it is shown that the protective pad 510 includes the common pad 410 when viewing in the third direction DR3, the present embodiment is not limited thereto. According to another embodiment of the disclosure, the protective pad 510 may fully overlap the common pad 410 when viewing in the third direction DR3.

The sealing membrane 700 may be between the protective layer 500 and the substrate 100 and between the protective pad 510 and the substrate 100. The sealing membrane 700 may extend along an edge of the protective layer 500 and an edge of the protective pad 510. The sealing membrane 700 may encompass the driving layer 200, the display layer 300, the common electrode layer 400, the common pad 410, the lower pad 610, and the conductive via 600 so that the driving layer 200, the display layer 300, the common electrode layer 400, the common pad 410, the lower pad 610, and the conductive via 600 are not damaged. An outer side surface 700s of the sealing membrane 700 may be orthogonal to the upper surface 100u of the substrate 100. The outer side surface 700s of the sealing membrane 700 may extend in the third direction DR3. Although it is shown that the outer side surface 700s of the sealing membrane 700 immediately adjacent to the second reference side surface 500s forms a coplanar surface with the second reference side surface 500s, the present embodiment is not limited thereto. According to another embodiment of the disclosure, the outer side surface 700s of the sealing membrane 700 may be stepped from the second reference side surface 500s, or the sealing membrane 700 may cover the second reference side surface 500s. The sealing membrane 700 may include an electrical insulating material. For example, the sealing membrane 700 may include silicon (Si) or a hot-melt epoxy adhesive.

An additional region R1 may be on the second reference side surface 500s. The additional region R1 may be between the sealing membrane 700 immediately adjacent to the second reference side surface 500s and the sealing membrane 700 under the protective pad 510. For example, an additional element may be at an opposite side of the additional region R1 with reference to the substrate 100. For example, the additional element may be at least one of a light-emitting element and an antenna element. When the additional element is a light-emitting element, the additional region R1 may be a region through which light generated by the light-emitting element is emitted to the outside of the display device 1. When the additional element is an antenna element, the additional region R1 may be a region for a smooth radio transmission and reception operation between the antenna element and an external device. When the driving layer 200, the display layer 300, and the common electrode layer 400 are in the additional region R1, the driving layer 200, the display layer 300, and the common electrode layer 400 may absorb light or disrupt communication.

Unlike the disclosure, when the common pad 410, the protective pad 510, the lower pad 610, and the conductive via 600 are adjacent to the driving chip 10, the substrate 100 at a side of the driving chip 10 may be demanded to have a wide area to arrange the common pad 410, the protective pad 510, the lower pad 610, and the conductive via 600. Like the disclosure, the additional region R1 may be separately demanded so that the display device 1 has an additional element (e.g., a light-emitting element of an antenna element).

The common pad 410, the protective pad 510, the lower pad 610, the conductive via 600, and the additional region R1 of the disclosure may be provided at an opposite side of the driving chip 10 to increase a degree of integration of the display device 1. A non-display area (i.e., an area except for the display area 300 when viewing in the third direction DR3) of the display device 1 may have a small size.

Figure 5:
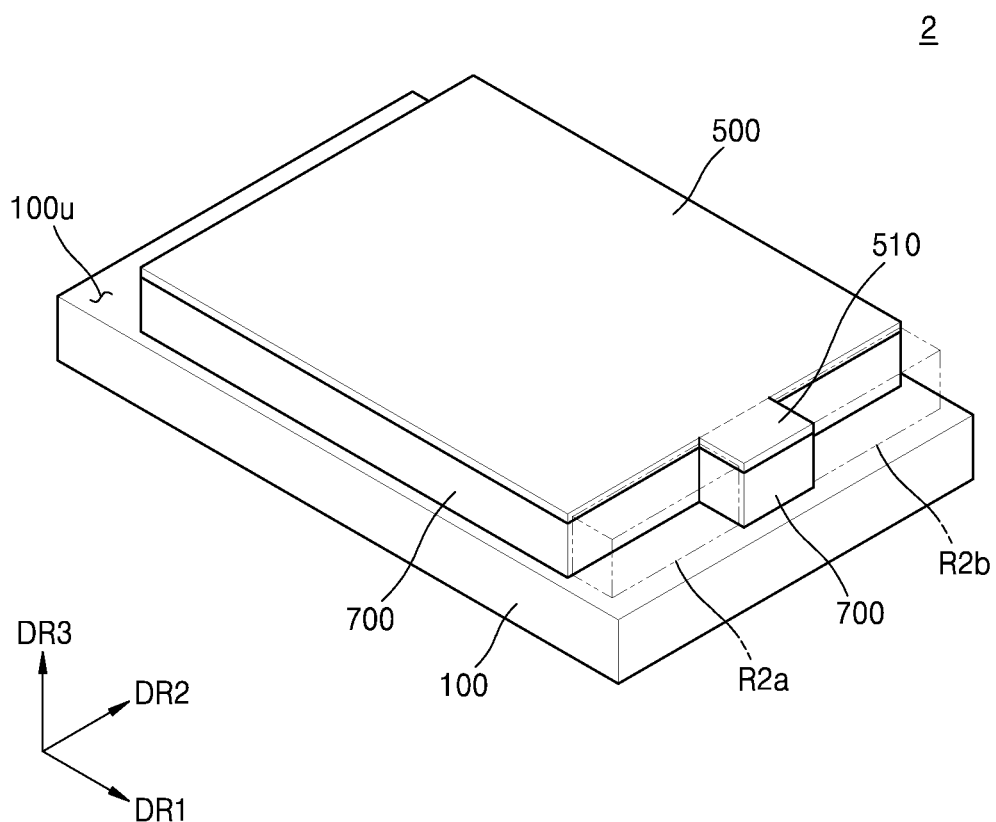
FIG. 5 is a perspective view of a display device according to an example embodiment of the disclosure.
Figure 6:
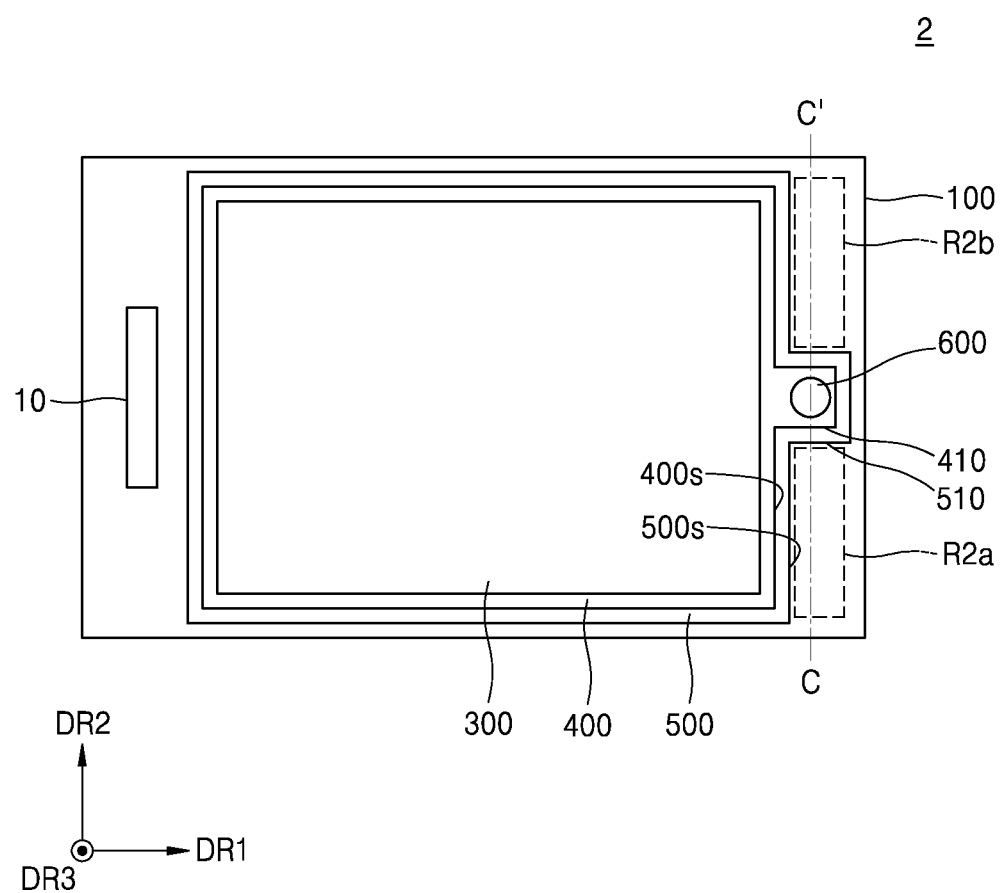
FIG. 6 is a top view of the display device of FIG. 5.
Figure 7:
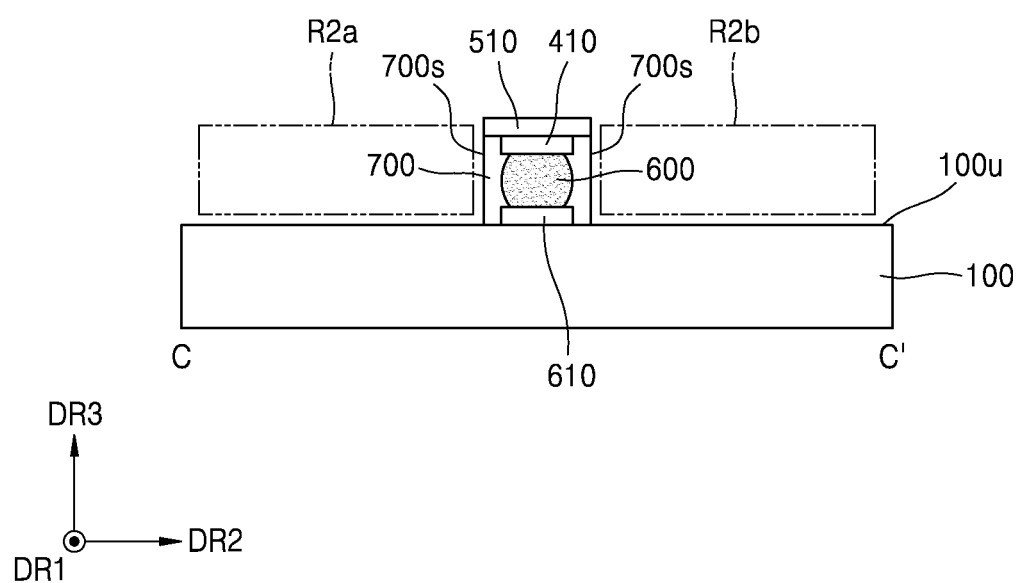
FIG. 7 is a cross-sectional view taken along line C-C' of FIG. 6.

FIG. 5 is a perspective view of a display device according to an example embodiment of the disclosure. FIG. 6 is a top view of the display device of FIG. 5. FIG. 7 is a cross-sectional view taken along line C-C' of FIG. 6. For conciseness of description, substantially the same description made with reference to FIGS. 1 to 4 may not be repeated.

Referring to FIGS. 5 to 7, a display device 2 may be provided. The display device 2 may include the substrate 100, the driving chip 10, the driving layer 200, the display layer 300, the common electrode layer 400, the common pad 410, the conductive via 600, the lower pad 610, the protective layer 500, the protective pad 510, and the sealing membrane 700.

Except for locations of the common pad 410, the protective pad 510, the lower pad 610, and the conductive via 600, the substrate 100, the driving chip 10, the driving layer 200, the display layer 300, the common electrode layer 400, the common pad 410, the conductive via 600, the lower pad 610, the protective layer 500, the protective pad 510, and the sealing membrane 700 may be substantially the same as those described with reference to FIGS. 1 to 4, respectively.

Unlike those described with reference to FIGS. 1 to 4, the common pad 410 may be between both end portions of the first reference side surface 400s in the second direction DR2. For example, the common pad 410 may be on a central part of the first reference side surface 400s. The lower pad 610 and the conductive via 600 may be under the common pad 410.

The protective pad 510 may be between both end portions of the second reference side surface 500s in the second direction DR2. For example, the protective pad 510 may be on a central part of the second reference side surface 500s. The protective pad 510 may be on the common pad 410 to cover the common pad 410.

A first additional region R2a and a second additional region R2b may be separated from each other with the protective pad 510 therebetween. Each of the first additional region R2a and the second additional region R2b may be the same as the additional region R1 described with reference to FIGS. 1 to 4 except for a location thereof.

The common pad 410, the protective pad 510, the lower pad 610, the conductive via 600, the first additional region R2a, and the second additional region R2b of the disclosure may be at an opposite side of the driving chip 10 to increase a degree of integration of the display device 2. The display device 2 may have a non-display area of a small area.

Figure 8:
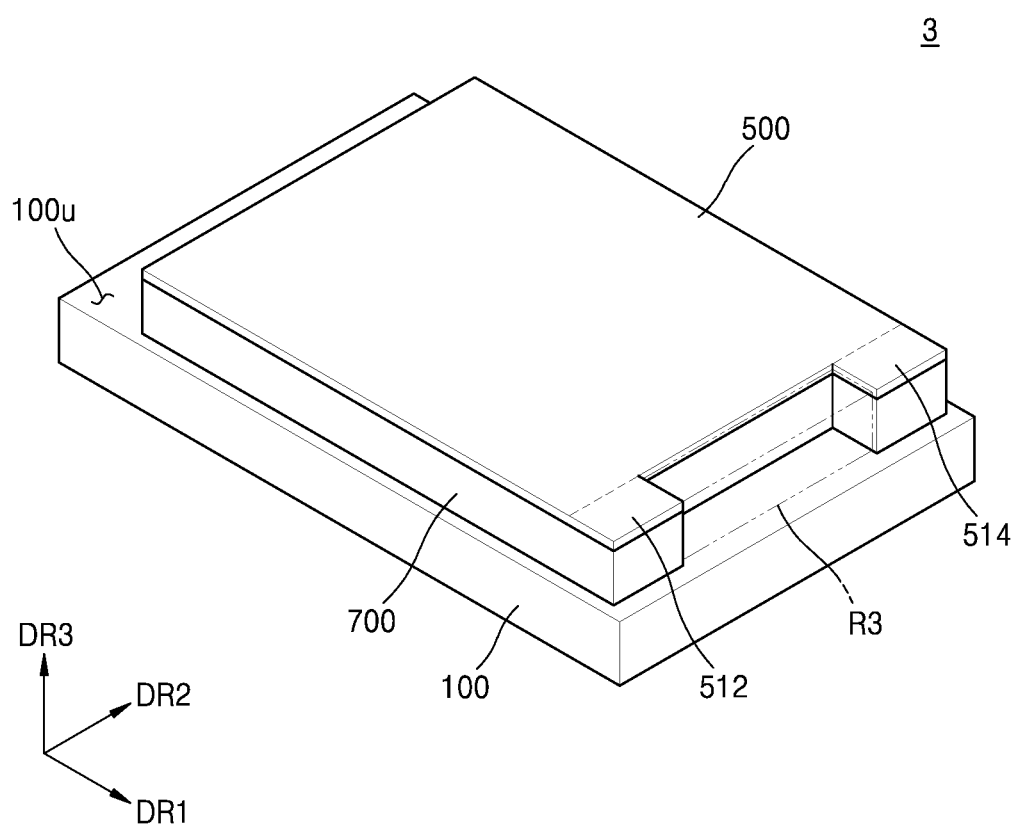
FIG. 8 is a perspective view of a display device according to an example embodiment of the disclosure.
Figure 9:
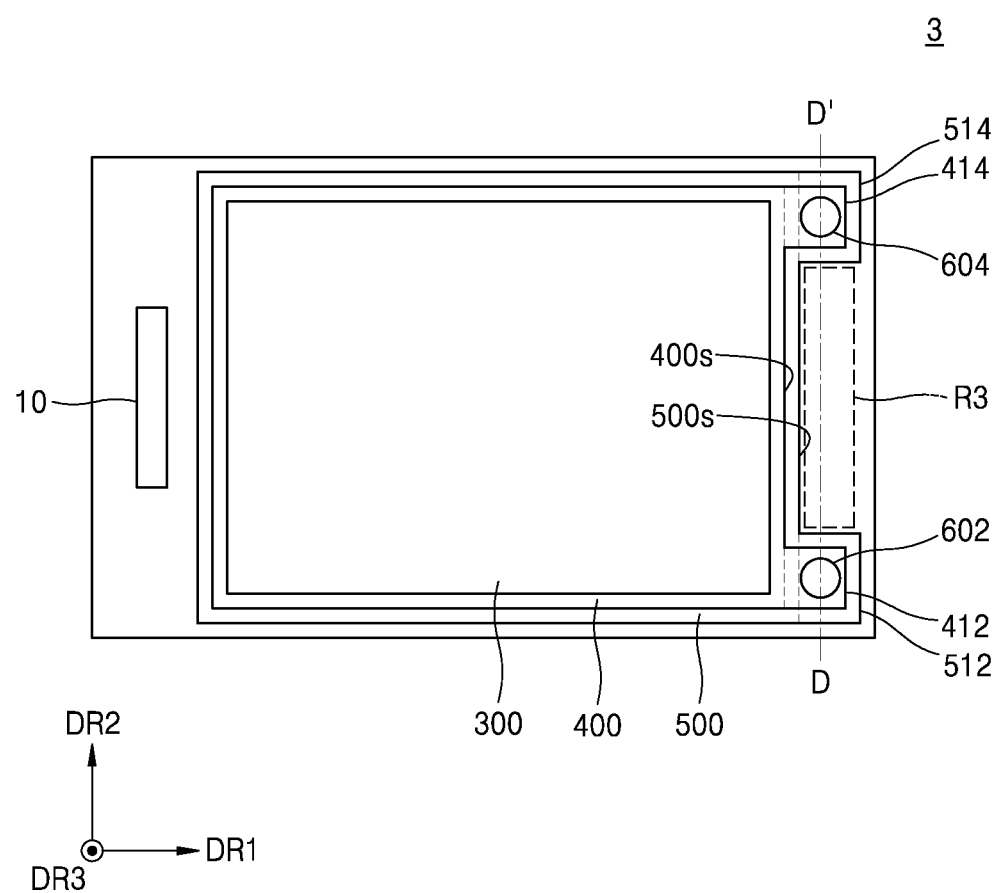
FIG. 9 is a top view of the display device of FIG. 8.
Figure 10:
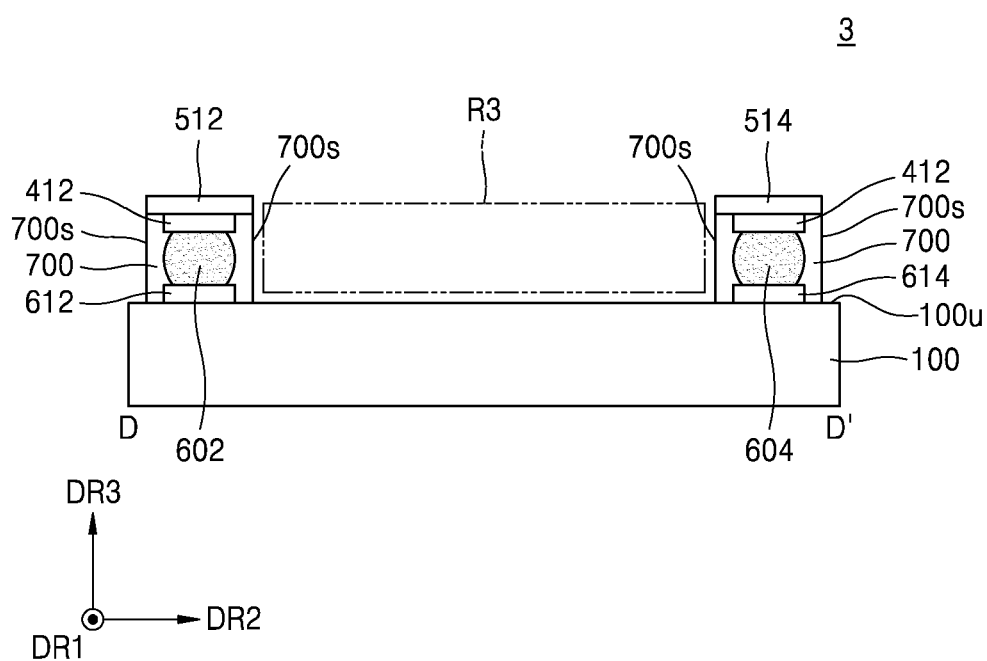
FIG. 10 is a cross-sectional view taken along line D-D' of FIG. 9.

FIG. 8 is a perspective view of a display device according to an example embodiment of the disclosure. FIG. 9 is a top view of the display device of FIG. 8. FIG. 10 is a cross-sectional view taken along line D-D' of FIG. 9. For conciseness of description, substantially the same description made with reference to FIGS. 1 to 4 may not be repeated.

Referring to FIGS. 8 to 10, a display device 3 may be provided. The display device 3 may include the substrate 100, the driving chip 10, the driving layer 200, the display layer 300, the common electrode layer 400, a first common pad 412, a second common pad 414, a first conductive via 602, a second conductive via 604, a first lower pad 612, a second lower pad 614, the protective layer 500, a first protective pad 512, a second protective pad 514, and the sealing membrane 700.

The substrate 100, the driving chip 10, the driving layer 200, the display layer 300, the common electrode layer 400, and the protective layer 500 may be substantially the same as the substrate 100, the driving chip 10, the driving layer 200, the display layer 300, the common electrode layer 400, and the protective layer 500 described with reference to FIGS. 1 to 4, respectively.

The first common pad 412 and the second common pad 414 may be on the first reference side surface 400s. The first common pad 412 and the second common pad 414 may be separated from each other in the second direction DR2. The first common pad 412 and the second common pad 414 may be on both end portions of the first reference side surface 400s in the second direction DR2, respectively. Each of the first common pad 412 and the second common pad 414 may be substantially the same as the common pad 410 described with reference to FIGS. 1 to 4 except for a location thereof.

The first lower pad 612 and the second lower pad 614 may be separated from each other in the second direction DR2. The first lower pad 612 and the second lower pad 614 may be under the first common pad 412 and the second common pad 414, respectively. Each of the first lower pad 612 and the second lower pad 614 may be substantially the same as the lower pad 610 described with reference to FIGS. 1 to 4 except for a location thereof.

The first conductive via 602 and the second conductive via 604 may be separated from each other in the second direction DR2. The first conductive via 602 may be between the first common pad 412 and the first lower pad 612. The second conductive via 604 may be between the second common pad 414 and the second lower pad 614. Each of the first conductive via 602 and the second conductive via 604 may be substantially the same as the conductive via 600 described with reference to FIGS. 1 to 4 except for a location thereof.

The first protective pad 512 and the second protective pad 514 may be on the second reference side surface 500s. The first protective pad 512 and the second protective pad 514 may be separated from each other in the second direction DR2. For example, the first protective pad 512 and the second protective pad 514 may be on both end portions of the second reference side surface 500s in the second direction DR2, respectively. The first protective pad 512 and the second protective pad 514 may be on the first common pad 412 and the second common pad 414, respectively. Each of the first protective pad 512 and the second protective pad 514 may be substantially the same as the protective pad 510 described with reference to FIGS. 1 to 4 except for a location thereof.

The sealing membrane 700 may extend on the substrate along an edge of the first protective pad 512, an edge of the second protective pad 514, and an edge of the protective layer 500. The sealing membrane 700 may be substantially the same as the sealing membrane 700 described with reference to FIGS. 1 to 4 except for a shape thereof.

An additional region R3 may be between the first protective pad 512 and the second protective pad 514. The additional region R3 may be substantially the same as the additional region R1 described with reference to FIGS. 1 to 4 except for a location thereof.

The first common pad 412, the first protective pad 512, the first lower pad 612, the first conductive via 602, the second common pad 414, the second protective pad 514, the second lower pad 614, the second conductive via 604, and the additional region R3 of the disclosure may be at an opposite side of the driving chip 10 to increase a degree of integration of the display device 3. The display device 3 may have a non-display area of a small area.

Figure 11:
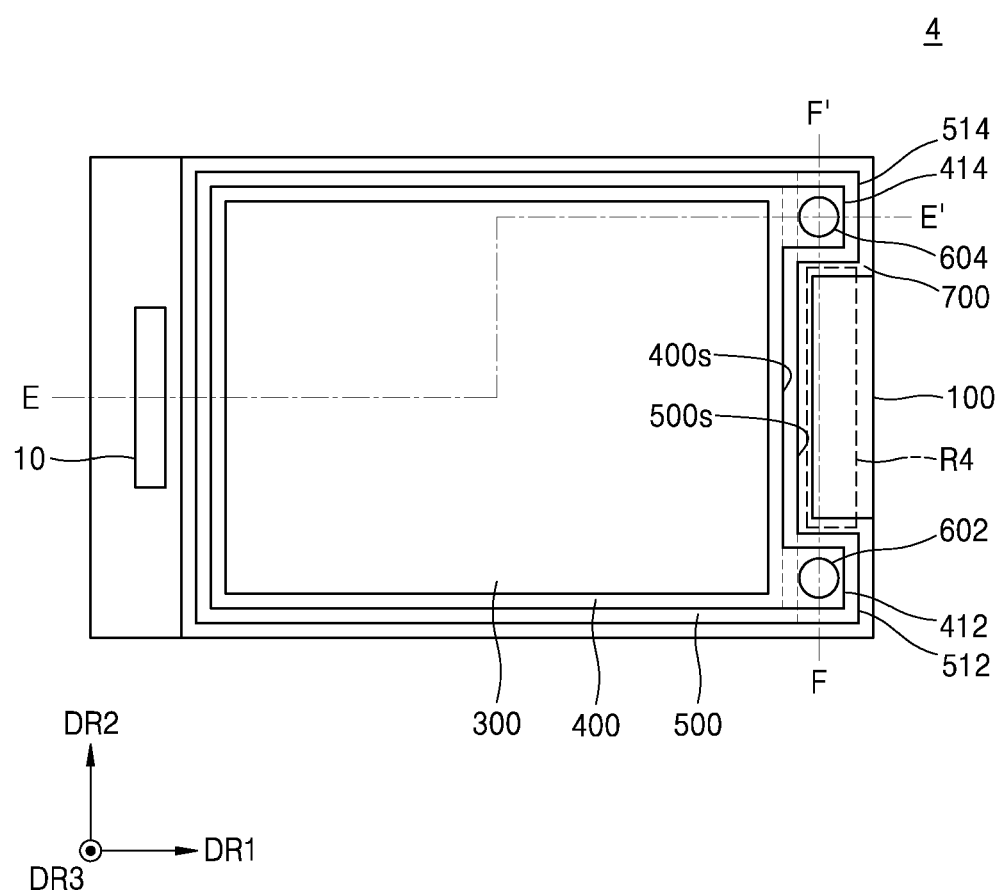
FIG. 11 is a perspective view of a display device according to an example embodiment of the disclosure.
Figure 12:
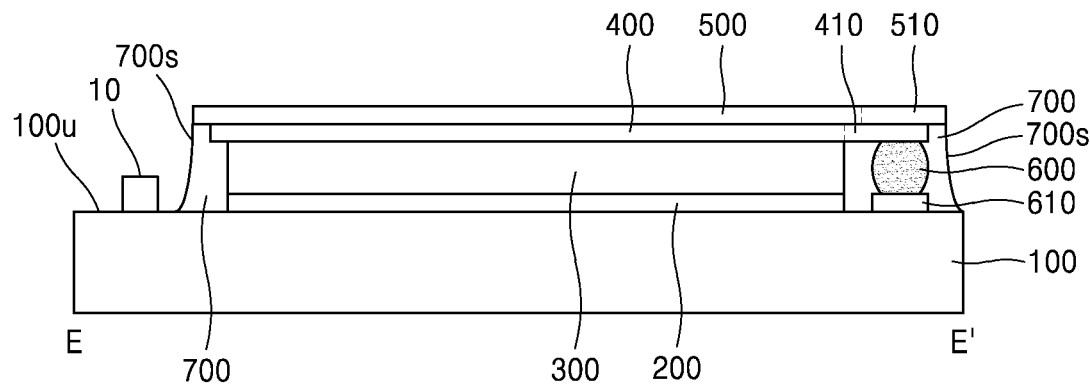
FIG. 12 is a cross-sectional view taken along line E-E' of FIG. 11.

FIG. 11 is a perspective view of a display device according to an example embodiment of the disclosure. FIG. 12 is a cross-sectional view taken along line E-E' of FIG. 11. FIG.

13 is a cross-sectional view taken along line F-F' of FIG. 11. For conciseness of description, substantially the same description made with reference to FIGS. 1 to 4 and 8 to 10 may not be repeated.

Figure 13:
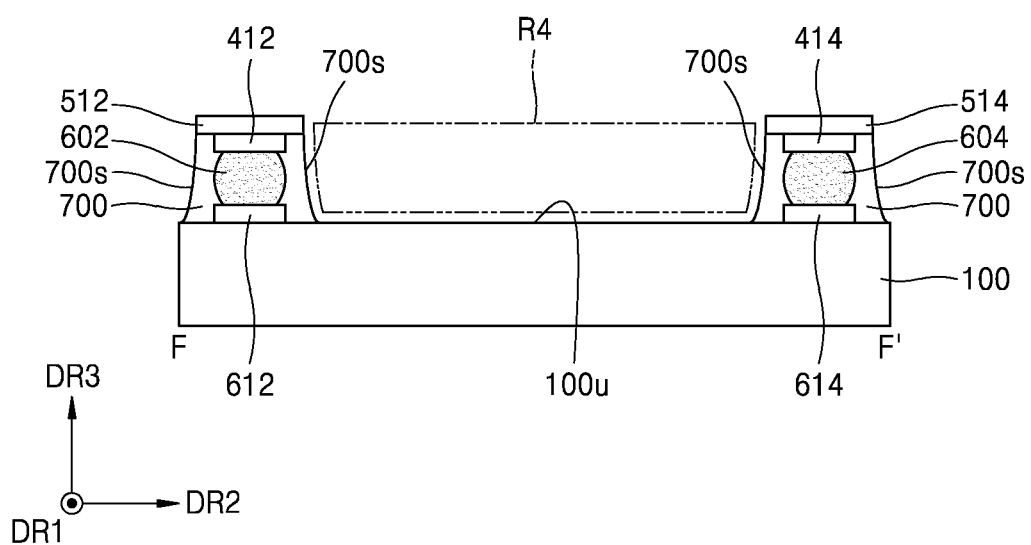
FIG. 13 is a cross-sectional view taken along line F-F' of FIG. 11.

Referring to FIGS. 11 to 13, a display device 4 may be provided. The display device 4 may include the substrate 100, the driving chip 10, the driving layer 200, the display layer 300, the common electrode layer 400, the first common pad 412, the second common pad 414, the first conductive via 602, the second conductive via 604, the first lower pad 612, the second lower pad 614, the protective layer 500, the first protective pad 512, the second protective pad 514, and the sealing membrane 700

The substrate 100, the driving chip 10, the driving layer 200, the display layer 300, the common electrode layer 400, and the protective layer 500 may be substantially the same as the substrate 100, the driving chip 10, the driving layer 200, the display layer 300, the common electrode layer 400, and the protective layer 500 described with reference to FIGS. 1 to 4, respectively. The first common pad 412, the second common pad 414, the first conductive via 602, the second conductive via 604, the first lower pad 612, the second lower pad 614, the first protective pad 512, and the second protective pad 514 may be substantially the same as the first common pad 412, the second common pad 414, the first conductive via 602, the second conductive via 604, the first lower pad 612, the second lower pad 614, the first protective pad 512, and the second protective pad 514 described with reference to FIGS. 8 to 10, respectively.

The outer side surface 700s of the sealing membrane 700 may be inclined. The outer side surface 700s of the sealing membrane 700 may extend in a direction intersecting with the third direction DR3. For example, when viewing in the third direction DR3, the outer side surface 700s of the sealing membrane 700 may be closer to the driving layer 200, the display layer 300, the common electrode layer 400, the first common pad 412, the second common pad 414, the protective layer 500, the first protective pad 512, the second protective pad 514 as the outer side surface 700s of the sealing membrane 700 is farther from the upper surface 100u of the substrate 100. For example, a length of the circumference of the outer side surface 700s of the sealing membrane 700 may be gradually less from the upper surface 100u of the substrate 100. The circumference of the outer side surface 700s of the sealing membrane 700 may be a closed loop extending on the outer side surface 700s in a direction parallel to the upper surface 100u of the substrate 100. Although it is shown that the outer side surface 700s of the sealing membrane 700 is a curved surface, the present embodiment is not limited thereto. The sealing membrane 700 may be substantially the same as the sealing membrane 700 described with reference to FIGS. 1 to 4 except for a shape of the outer side surface 700s thereof.

An additional region R4 may be between the first protective pad 512 and the second protective pad 514. The additional region R4 may be substantially the same as the additional region R1 described with reference to FIGS. 1 to 4 except for a location thereof.

The first common pad 412, the first protective pad 512, the first lower pad 612, the first conductive via 602, the second common pad 414, the second protective pad 514, the second lower pad 614, the second conductive via 604, and the additional region R4 of the disclosure may be at an opposite side of the driving chip 10 to provide the display device 4. The display device 4 may have a non-display area of a small area.

Figure 14:
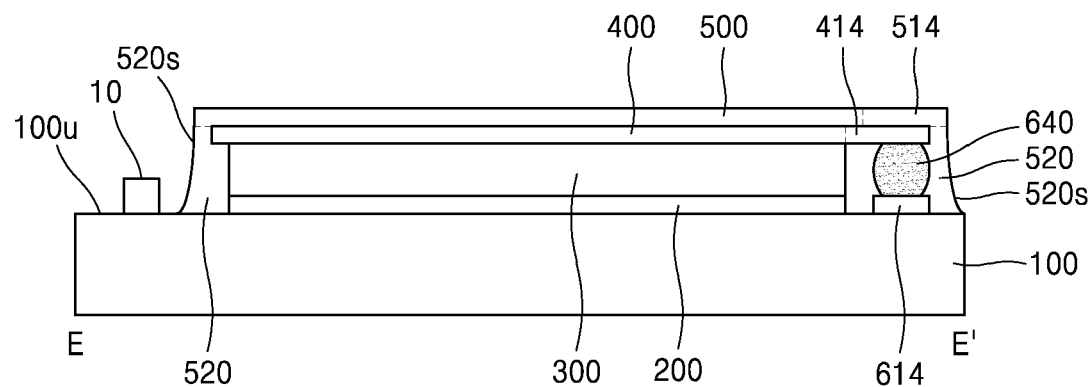
FIG. 14 is a cross-sectional view taken along line E-E' of FIG. 11 in a display device according to an example embodiment of the disclosure.
Figure 15:
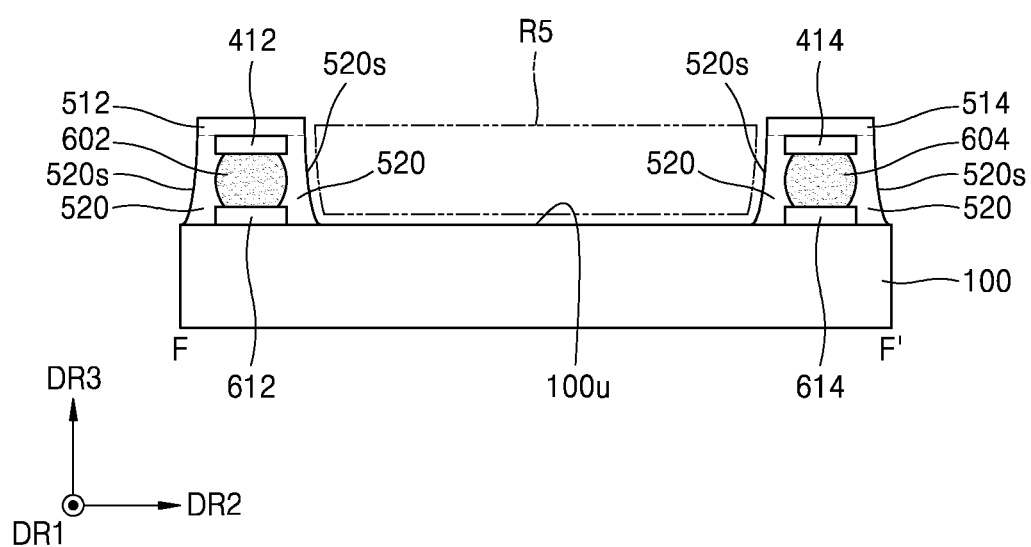
FIG. 15 is a cross-sectional view taken along line F-F' of FIG. 11 in the display device of FIG. 14.

FIG. 14 is a cross-sectional view taken along line E-E' of FIG. 11 in a display device according to an example embodiment of the disclosure. FIG. 15 is a cross-sectional view taken along line F-F' of FIG. 11 in the display device of FIG. 14. For conciseness of description, substantially the same description made with reference to FIGS. 1 to 4, 8 to 10, and 11 to 13 may not be repeated.

Referring to FIGS. 14 and 15, a display device 5 may be provided. The display device 5 may include the substrate 100, the driving chip 10, the driving layer 200, the display layer 300, the common electrode layer 400, the first common pad 412, the second common pad 414, the first conductive via 602, the second conductive via 604, the first lower pad 612, the second lower pad 614, the protective layer 500, the first protective pad 512, the second protective pad 514, and a sealing membrane 520.

The substrate 100, the driving chip 10, the driving layer 200, the display layer 300, the common electrode layer 400, and the protective layer 500 may be substantially the same as the substrate 100, the driving chip 10, the driving layer 200, the display layer 300, the common electrode layer 400, and the protective layer 500 described with reference to FIGS. 1 to 4, respectively. The first common pad 412, the second common pad 414, the first conductive via 602, the second conductive via 604, the first lower pad 612, the second lower pad 614, the first protective pad 512, and the second protective pad 514 may be substantially the same as the first common pad 412, the second common pad 414, the first conductive via 602, the second conductive via 604, the first lower pad 612, the second lower pad 614, the first protective pad 512, and the second protective pad 514 described with reference to FIGS. 8 to 10, respectively.

The sealing membrane 520 may form a single layer with the protective layer 500. In other words, the sealing membrane 520 and the protective layer 500 may be connected to each other without a boundary surface therebetween. The sealing membrane 520 may form a single layer with the first protective pad 512. In other words, the sealing membrane 520 and the first protective pad 512 may be connected to each other without a boundary surface therebetween. The sealing membrane 520 may form a single layer with the second protective pad 514. In other words, the sealing membrane 520 and the second protective pad 514 may be connected to each other without a boundary surface therebetween. For example, the sealing membrane 520, the protective layer 500, the first protective pad 512, and the second protective pad 514 may form a single layer. The sealing membrane 520 may include the same material as the protective pad 510 includes. For example, the sealing membrane 520 may include a PET film. An outer side surface 520s of the sealing membrane 520 may be inclined as described with reference to FIGS. 11 to 13. The sealing membrane 520 may be substantially the same as the sealing membrane 700 described with reference to FIGS. 1 to 4 except for the above description.

An additional region R5 may be between the first protective pad 512 and the second protective pad 514. The additional region R5 may be substantially the same as the additional region R1 described with reference to FIGS. 1 to 4 except for a location thereof.

The first common pad 412, the first protective pad 512, the first lower pad 612, the first conductive via 602, the second common pad 414, the second protective pad 514, the second lower pad 614, the second conductive via 604, and the additional region R5 of the disclosure may be at an opposite side of the driving chip 10 to provide the display device 5. The display device 5 may have a non-display area of a small area.

Figure 16:
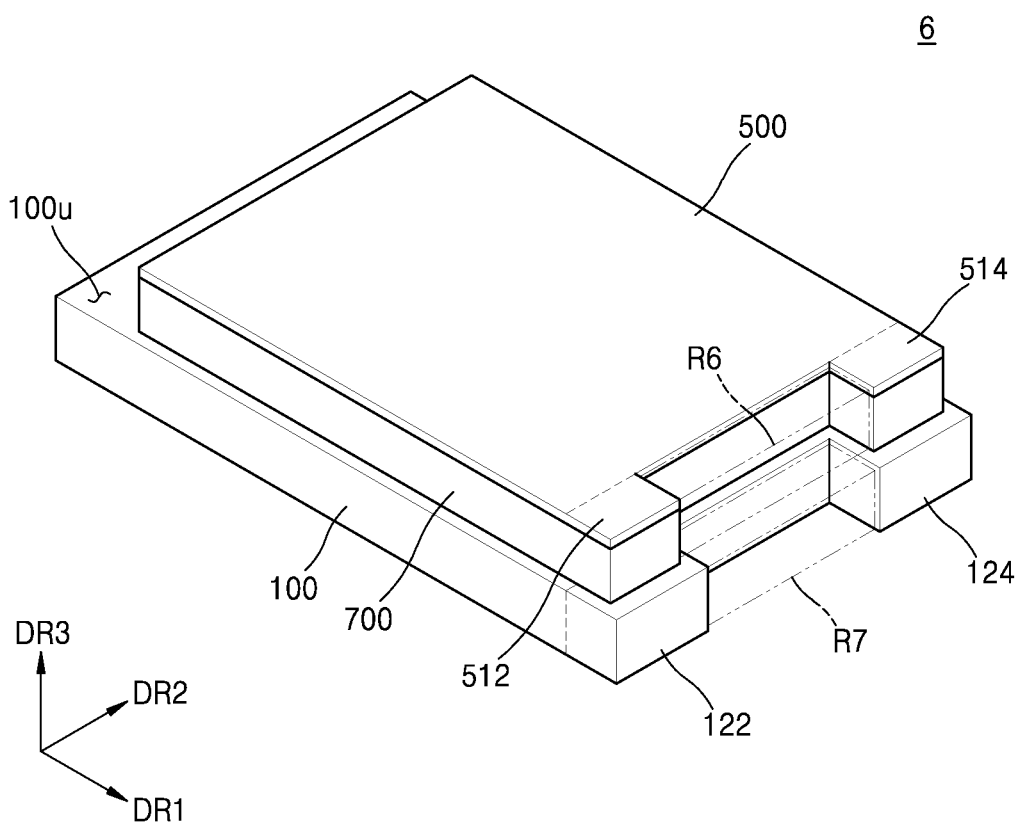
FIG. 16 is a perspective view of a display device according to an example embodiment of the disclosure.
Figure 17:
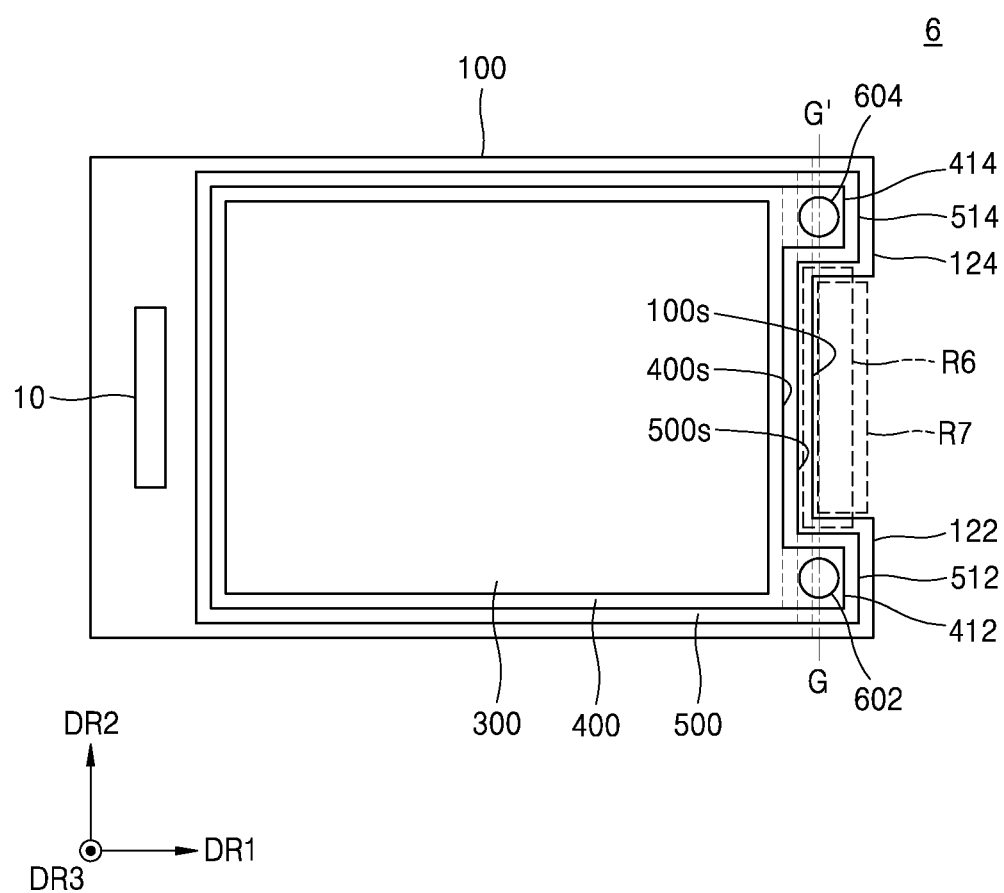
FIG. 17 is a top view of the display device of FIG. 16.
Figure 18:
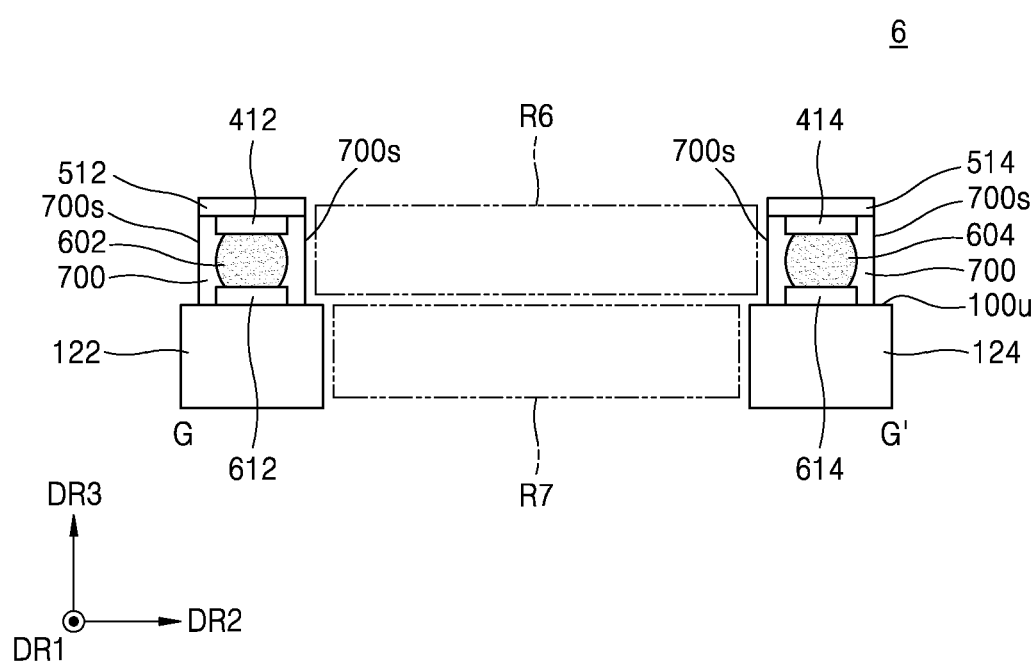
FIG. 18 is a cross-sectional view taken along line G-G' of FIG. 17.

FIG. 16 is a perspective view of a display device according to an example embodiment of the disclosure. FIG. 17 is a top view of the display device of FIG. 16. FIG. 18 is a cross-sectional view taken along line G-G' of FIG. 17. For conciseness of description, substantially the same description made with reference to FIGS. 1 to 4 and 8 to 10 may not be repeated.

Referring to FIGS. 16 to 18, a display device 6 may be provided. The display device 6 may include the substrate 100, a first protruding substrate 122, a second protruding substrate 124, the driving chip 10, the driving layer 200, the display layer 300, the common electrode layer 400, the first common pad 412, the second common pad 414, the first conductive via 602, the second conductive via 604, the first lower pad 612, the second lower pad 614, the protective layer 500, the first protective pad 512, the second protective pad 514, and the sealing membrane 700.

The substrate 100, the driving chip 10, the driving layer 200, the display layer 300, the common electrode layer 400, and the protective layer 500 may be substantially the same as the substrate 100, the driving chip 10, the driving layer 200, the display layer 300, the common electrode layer 400, and the protective layer 500 described with reference to FIGS. 1 to 4, respectively. The first common pad 412, the second common pad 414, the first conductive via 602, the second conductive via 604, the first lower pad 612, the second lower pad 614, the first protective pad 512, the second protective pad 514, and the sealing membrane 700 may be substantially the same as the first common pad 412, the second common pad 414, the first conductive via 602, the second conductive via 604, the first lower pad 612, the second lower pad 614, the first protective pad 512, the second protective pad 514, and the sealing membrane 700 described with reference to FIGS. 8 to 10, respectively.

The first protruding substrate 122 and the second protruding substrate 124 may be on a third reference side surface 100s. The third reference side surface 100s may be a side surface of the substrate 100 oriented in the first direction DR1. The first protruding substrate 122 and the second protruding substrate 124 may be on both end portions of the third reference side surface 100s in the second direction DR2. The first protruding substrate 122 and the second protruding substrate 124 may protrude from the third reference side surface 100s. For example, the first protruding substrate 122 and the second protruding substrate 124 may extend on the third reference side surface 100s in the first direction DR1. The first protruding substrate 122 and the second protruding substrate 124 may include a transparent electrical insulating material. For example, the first protruding substrate 122 and the second protruding substrate 124 may include glass. For example, the first protruding substrate 122 and the second protruding substrate 124 may form a single layer with the substrate 100. In other words, each of the first protruding substrate 122 and the second protruding substrate 124 and the substrate 100 may be connected to each other without a boundary surface therebetween. For example, the first protruding substrate 122 and the second protruding substrate 124 may be separated from the substrate 100. In other words, each of the first protruding substrate 122 and the second protruding substrate 124 and the substrate 100 may be connected to each other with a boundary surface therebetween.

The first lower pad 612, the first conductive via 602, first common pad 412, and the first protective pad 512 may be sequentially on the first protruding substrate 122. The second lower pad 614, the second conductive via 604, the second common pad 414, and the second protective pad 514 may be sequentially on the second protruding substrate 124. The sealing membrane 700 may be between the first protruding substrate 122 and the first protective pad 512 and between the second protruding substrate 124 and the second protective pad 514.

An upper additional region R6 may be between the first protective pad 512 and the second protective pad 514. A lower additional region R7 may be between the first protruding substrate 122 and the second protruding substrate 124. Unlike the description made with reference to FIGS. 1 to 4, an additional element may be under the lower additional region R7. When the additional element is a light-emitting element, the upper additional region R6 and the lower additional region R7 may be regions through which light generated by the light-emitting element is emitted to the outside of the display device 6. When the additional element is an antenna element, the upper additional region R6 and the lower additional region R7 may be regions for a smooth radio transmission and reception operation between the antenna element and an external device.

Although it is shown that the sealing membrane 700 immediately adjacent to the third reference side surface 100s is stepped from the third reference side surface 100s, the present embodiment is not limited thereto. According to another embodiment of the disclosure, the third reference side surface 100s may form a coplanar surface with the sealing membrane 700. Although it is shown that the first protective pad 512 and the second protective pad 514 are respectively inside the first protruding substrate 122 and the second protruding substrate 124 when viewing in the third direction DR3, the present embodiment is not limited thereto. According to another embodiment of the disclosure, the first protective pad 512 and the second protective pad 514 may fully overlap the first protruding substrate 122 and the second protruding substrate 124, respectively.

The first common pad 412, the first protective pad 512, the first lower pad 612, the first conductive via 602, the second common pad 414, the second protective pad 514, the second lower pad 614, the second conductive via 604, the upper additional region R6, and the lower additional region R7 of the disclosure may be at an opposite side of the driving chip 10. The display device 6 may have a non-display area of a small area.

Figure 19:
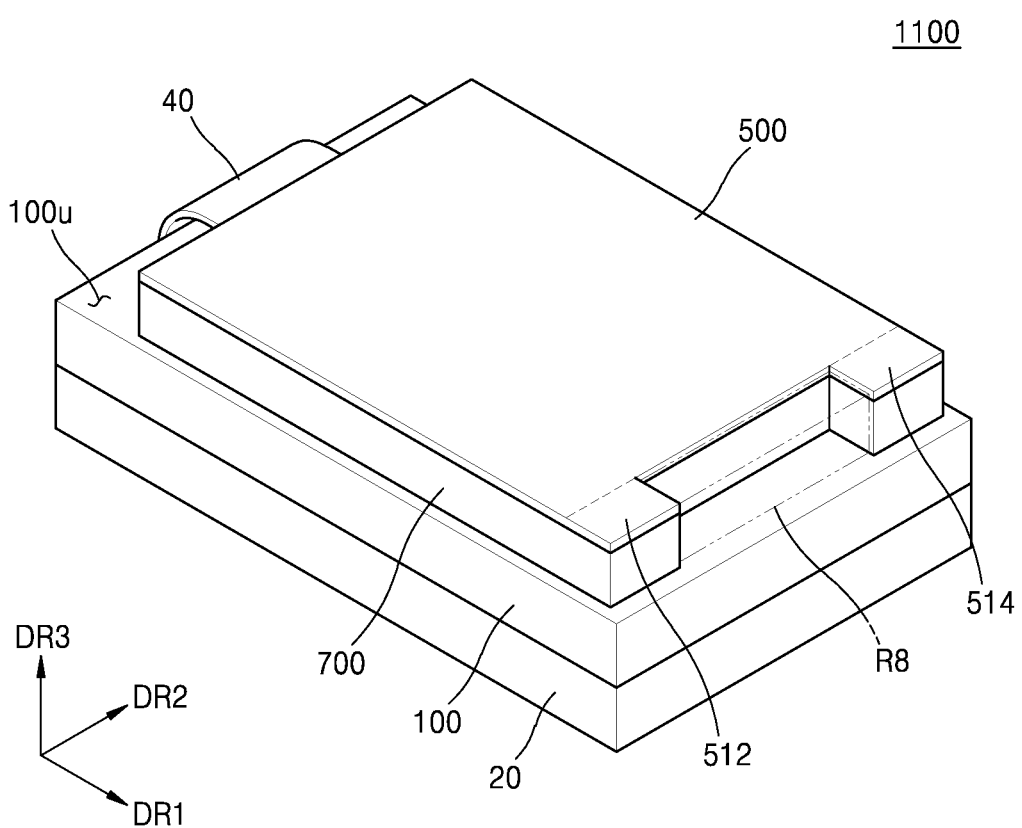
FIG. 19 is a perspective view of a display device according to an example embodiment of the disclosure.
Figure 20:
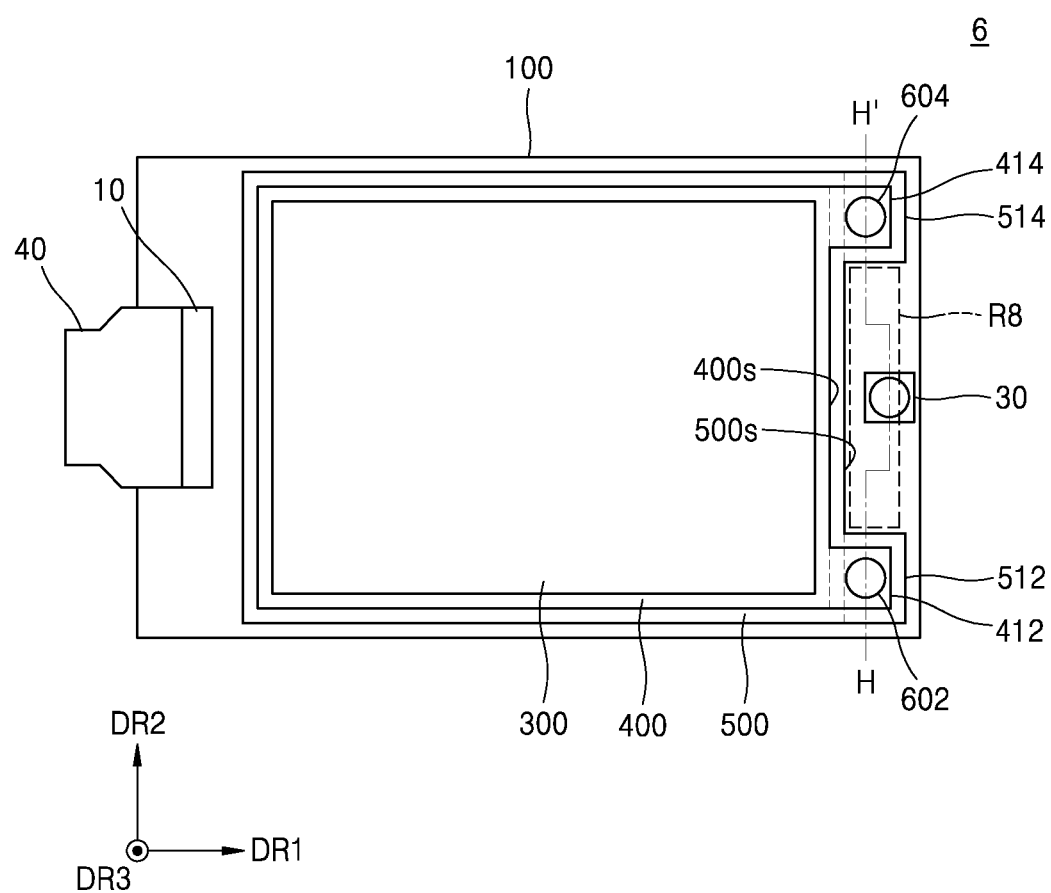
FIG. 20 is a top view of the display device of FIG. 19.
Figure 21:
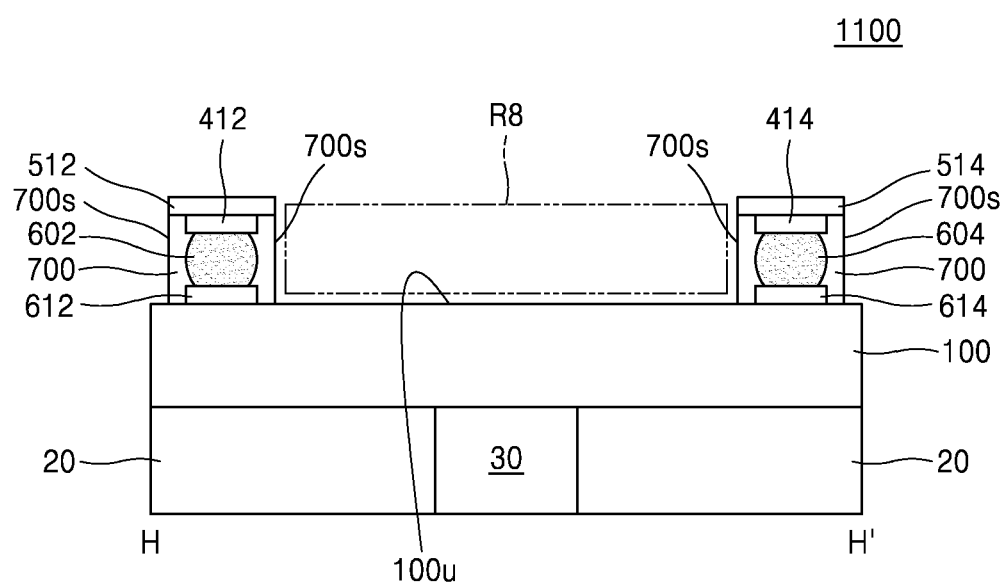
FIG. 21 is a cross-sectional view taken along line H-H' of FIG. 20.

FIG. 19 is a perspective view of a display device according to an example embodiment of the disclosure. FIG. 20 is a top view of the display device of FIG. 19. FIG. 21 is a cross-sectional view taken along line H-H' of FIG. 20. For conciseness of description, substantially the same description made with reference to FIGS. 1 to 4 and 8 to 10 may not be repeated.

Referring to FIGS. 19 to 21, a display device 1100 may be provided. The display device 1100 may include the substrate 100, the driving chip 10, the driving layer 200, the display layer 300, the common electrode layer 400, the first common pad 412, the second common pad 414, the first conductive via 602, the second conductive via 604, the first lower pad 612, the second lower pad 614, the protective layer 500, the first protective pad 512, the second protective pad 514, the sealing membrane 700, a printed circuit board 20, a connector 40, and a light-emitting element 30. The substrate 100, the driving chip 10, the driving layer 200, the display layer 300, the common electrode layer 400, and the protective layer 500 may be substantially the same as the substrate 100, the driving chip 10, the driving layer 200, the display layer 300, the common electrode layer 400, and the protective layer 500 described with reference to FIGS. 1 to 4, respectively. The first common pad 412, the second common pad 414, the first conductive via 602, the second conductive via 604, the first lower pad 612, the second lower pad 614, the first protective pad 512, the second protective pad 514, and the sealing membrane 700 may be substantially the same as the first common pad 412, the second common pad 414, the first conductive via 602, the second conductive via 604, the first lower pad 612, the second lower pad 614, the first protective pad 512, the second protective pad 514, and the sealing membrane 700 described with reference to FIGS. 8 to 10, respectively.

The printed circuit board 20 may be at an opposite side of an electronic paper layer with reference to the substrate 100. The printed circuit board 20 may include certain elements configured to control the display device 1100. For example, the printed circuit board 20 may include a control element configured to generate a command signal to be provided to the driving chip 10, a storage element, a communication element, and an input element to which a user of the display device 1100 inputs a signal. The printed circuit board 20 may be electrically connected to the driving chip 10 by the connector 40.

The light-emitting element 30 may be provided to the printed circuit board 20. For example, the light-emitting element 30 may be inserted into the printed circuit board 20 and pass through the printed circuit board 20. The light-emitting element 30 may overlap an additional region R8 in the third direction DR3. Light emitted from the light-emitting element 30 may sequentially pass through the substrate 100 and the additional region R8. For example, the light-emitting element 30 may include a light-emitting diode (LED). According to another embodiment of the disclosure, an antenna element may be provided to the printed circuit board 20 instead of or together with the light-emitting element 30.

The first common pad 412, the first protective pad 512, the first lower pad 612, the first conductive via 602, the second common pad 414, the second protective pad 514, the second lower pad 614, the second conductive via 604, and the additional region R8 of the disclosure may be at an opposite side of the driving chip 10. The display device 1100 may have a non-display area of a small area.

Figure 22:
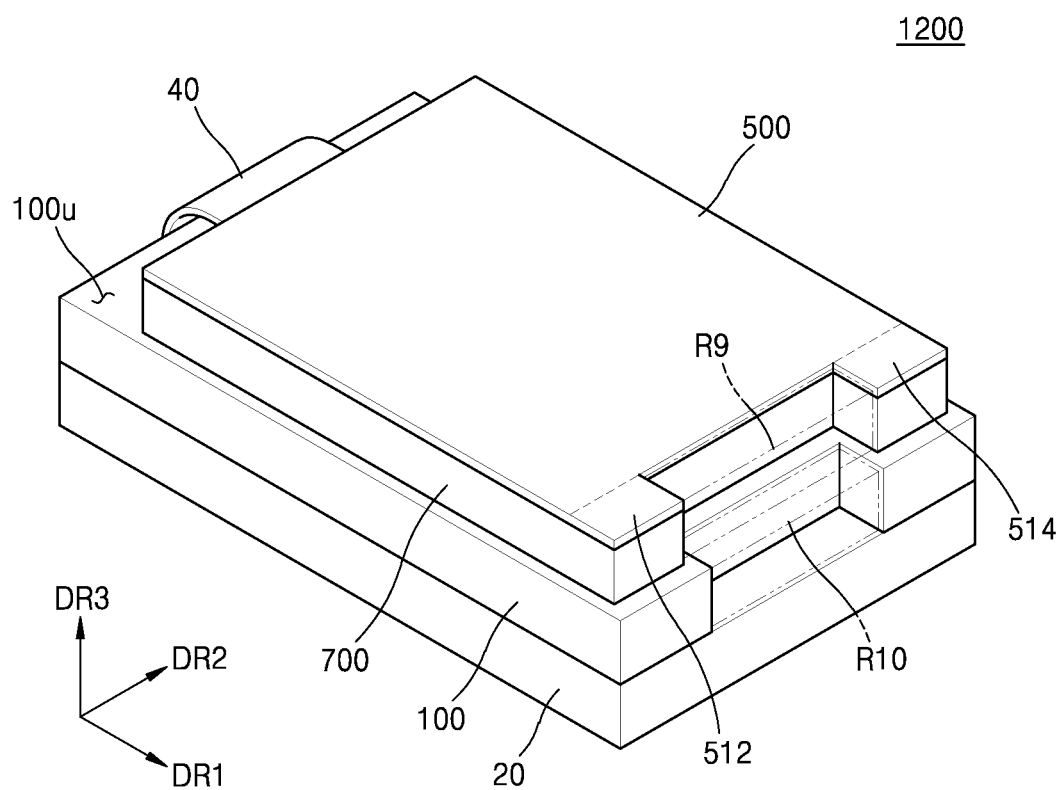
FIG. 22 is a perspective view of a display device according to an example embodiment of the disclosure.
Figure 23:
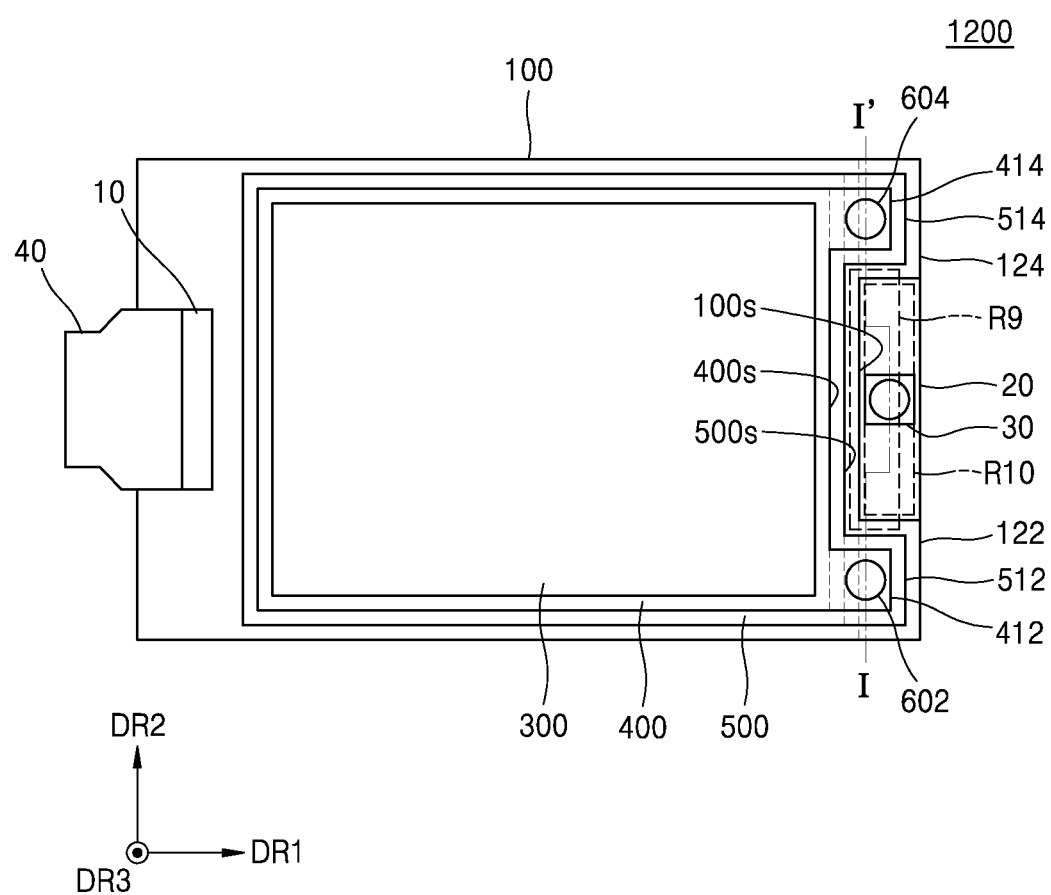
FIG. 23 is a top view of the display device of FIG. 22.
Figure 24:
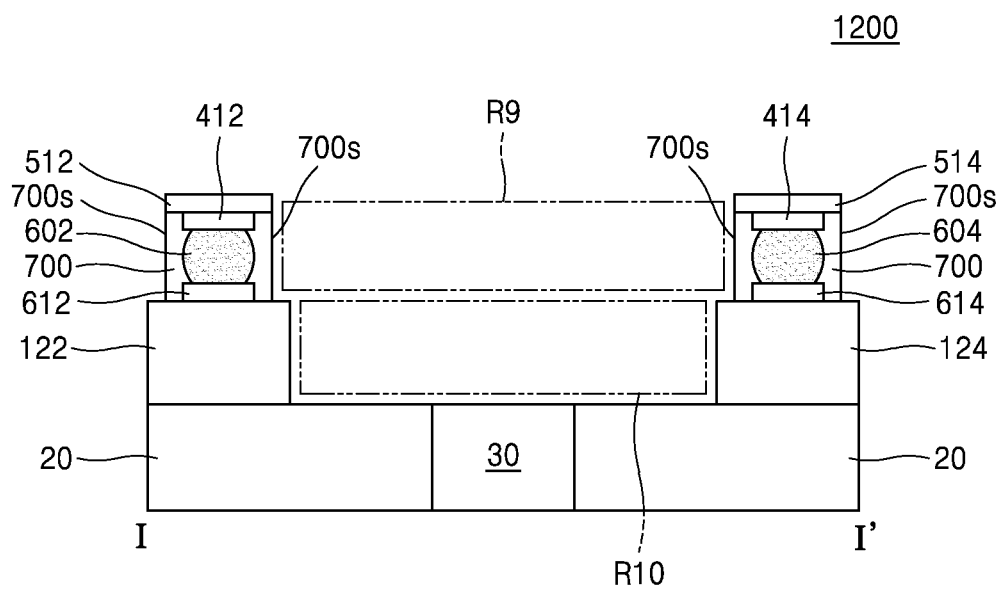
FIG. 24 is a cross-sectional view taken along line I-I' of FIG. 23.

FIG. 22 is a perspective view of a display device according to an example embodiment of the disclosure. FIG. 23 is a top view of the display device of FIG. 22. FIG. 24 is a cross-sectional view taken along line I-I' of FIG. 23. For conciseness of description, substantially the same description made with reference to FIGS. 1 to 4, 8 to 10, and 16 to 18 may not be repeated.

Referring to FIGS. 22 to 24, a display device 1200 may be provided. The display device 1200 may include the substrate 100, the first protruding substrate 122, the second protruding substrate 124, the driving chip 10, the driving layer 200, the display layer 300, the common electrode layer 400, the first common pad 412, the second common pad 414, the first conductive via 602, the second conductive via 604, the first lower pad 612, the second lower pad 614, the protective layer 500, the first protective pad 512, the second protective pad 514, the sealing membrane 700, the printed circuit board 20, the connector 40, and the light-emitting element 30.

The substrate 100, the driving chip 10, the driving layer 200, the display layer 300, the common electrode layer 400, and the protective layer 500 may be substantially the same as the substrate 100, the driving chip 10, the driving layer 200, the display layer 300, the common electrode layer 400, and the protective layer 500 described with reference to FIGS. 1 to 4, respectively. The first common pad 412, the second common pad 414, the first conductive via 602, the second conductive via 604, the first lower pad 612, the second lower pad 614, the first protective pad 512, the second protective pad 514, and the sealing membrane 700 may be substantially the same as the first common pad 412, the second common pad 414, the first conductive via 602, the second conductive via 604, the first lower pad 612, the second lower pad 614, the first protective pad 512, the second protective pad 514, and the sealing membrane 700 described with reference to FIGS. 8 to 10, respectively. The first protruding substrate 122 and the second protruding substrate 124 may be substantially the same as the first protruding substrate 122 and the second protruding substrate 124 described with reference to FIGS. 16 to 18, respectively.

The printed circuit board 20 may be at an opposite side of an electronic paper layer with reference to the substrate 100. The printed circuit board 20 may include certain elements configured to control the display device 1200. For example, the printed circuit board 20 may include a control element configured to generate a command signal to be provided to the driving chip 10, a storage element, a communication element, and an input element to which a user of the display device 1200 inputs a signal. The printed circuit board 20 may be electrically connected to the driving chip 10 by the connector 40.

The light-emitting element 30 may be provided to the printed circuit board 20. For example, the light-emitting element 30 may be inserted into the printed circuit board 20 and pass through the printed circuit board 20. The light-emitting element 30 may overlap an upper additional region R9 and a lower additional region R10 in the third direction DR3. The light-emitting element 30 may be exposed by the lower additional region R10 Light emitted from the light-emitting element 30 may sequentially pass through the lower additional region R10 and the upper additional region R9. For example, the light-emitting element 30 may include an LED. According to another embodiment of the disclosure, an antenna element may be provided to the printed circuit board 20 instead of or together with the light-emitting element 30.

The first common pad 412, the first protective pad 512, the first lower pad 612, the first conductive via 602, the second common pad 414, the second protective pad 514, the second lower pad 614, the second conductive via 604, and the additional region R9 of the disclosure may be at an opposite side of the driving chip 10. The display device 1200 may have a non-display area of a small area.

Figure 25:
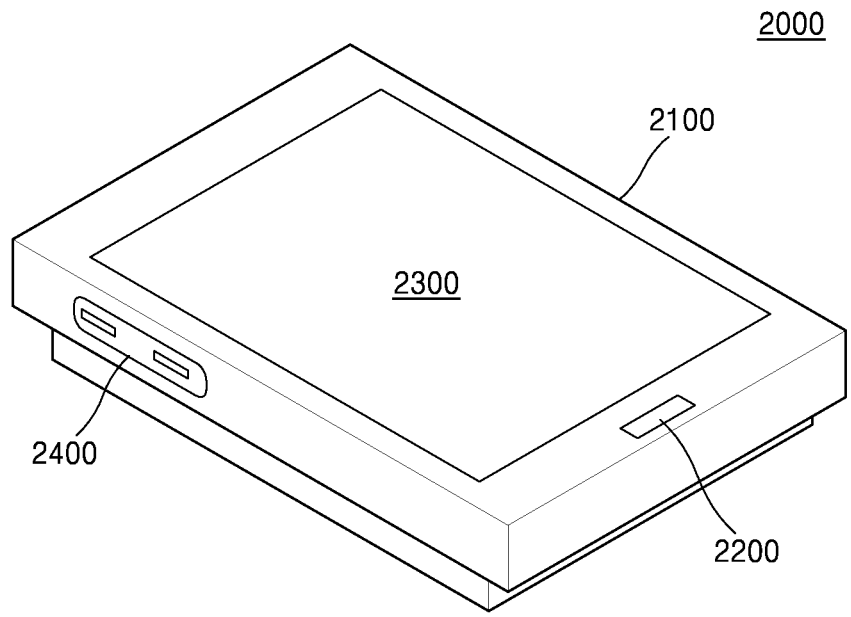
FIG. 25 is a perspective view of a display device according to an example embodiment of the disclosure.
Figure 26:
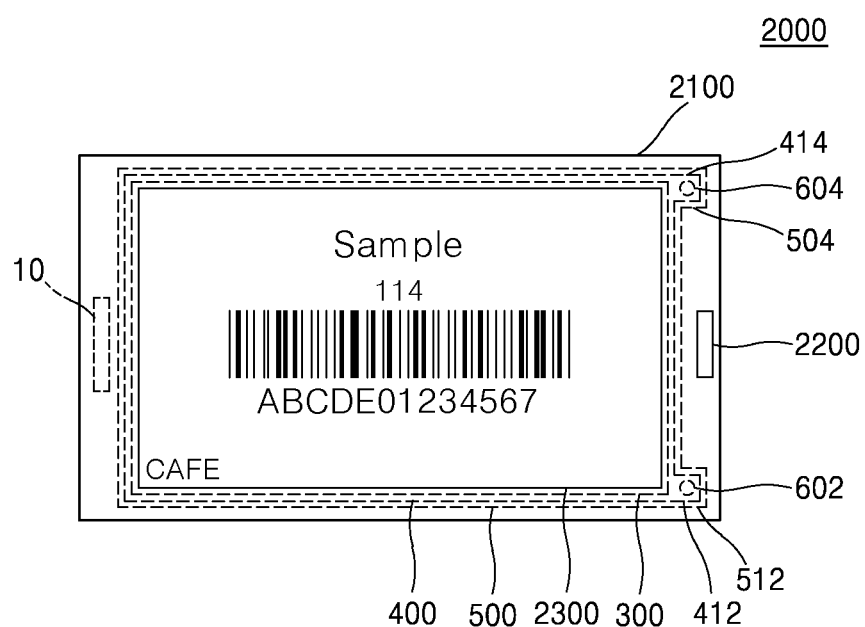
FIG. 26 is a top view of the display device of FIG. 25.

FIG. 25 is a perspective view of a display device according to an example embodiment of the disclosure. FIG. 26 is a top view of the display device of FIG. 25. For conciseness of description, substantially the same description made with reference to FIGS. 19 to 21 and 22 to 24 may not be repeated.

Referring to FIGS. 25 and 26, a display device 2000 including a housing 2100, a first window 2200, a second window 2300, and an input region 2400 may be provided. The housing 2100 may encompass the display device 1100 described with reference to FIGS. 19 to 21 or the display device 1200 described with reference to FIGS. 22 to 24.

The first window 2200 may be on a light-emitting element. The first window 2200 may receive light generated by the light-emitting element and emit the light to the outside of the display device 2000. The first window 2200 may include a transparent material or a translucent material or have an opening.

The second window 2300 may be on the display layer 300. A user of the display device 2000 may view the contents displayed on the display layer 300, through the second window 2300. The second window 2300 may include a transparent material or have an opening. Although it is shown that the second window 2300 is included in the display layer 300 when viewing in a direction in which the second window 2300 faces the display layer 300, the present embodiment is not limited thereto. As another example, the second window 2300 may fully overlap the display layer 300 when viewing in the direction in which the second window 2300 faces the display layer 300.

The first common pad 412, the first protective pad 512, the first lower pad 612, the first conductive via 602, the second common pad 414, the second protective pad 514, the second lower pad 614, the second conductive via 604, and an additional region of the disclosure may be at an opposite side of a driving chip. The display device 2000 may have a non-display area of a small area.

The disclosure may provide a display device including a minimized non-display area.

The disclosure may provide a display device including an additional element.

However, the effects of the disclosure are not limited to those effects described herein.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the disclosure as defined by the following claims.

What is claimed is:

1. A display device comprising:
   a substrate;
   a common electrode layer coupled to the substrate, the common electrode layer comprising a first common pad protruding in a first direction from a first reference side surface extending in a second direction, intersecting the first direction and a second common pad protruding from the first reference side surface;
   a driving layer between the substrate and the common electrode layer;
   a display layer between the driving layer and the common electrode layer;
   a first conductive via apart from the driving layer and between the substrate and the first common pad;
   a second conductive via apart from the first conductive via in the second direction;
   a driving chip coupled to the substrate and positioned at an opposite side, relative to the driving layer along the first direction, from the first conductive via so that the driving chip and the first conductive via are at opposite sides of the driving layer: and
   a protective layer on the common electrode layer, the protective layer comprising a first protective pad on the first common pad and a second protective pad on the second common pad,
   wherein the substrate comprises;
   a first protruding substrates disposed at the opposite side of the first protective pad with reference to the first conductive via, and
   a second protruding substrates disposed at the oposite side of the second protective pad with reference to the second conductive via and protruding from a third reference side surface of the substrate extending in the first direction.

2. The display device of claim 1, wherein the first and second common pads are respectively on both end portions of the first reference side surface arranged at opposite sides in the second direction.

3. The display device of claim 2, wherein
   the first and second protective pads protrude from a second reference side surface of the protective layer extending in the second direction, and
   the protective layer, the first protective pad, and the second protective pad include an electrical insulating material.

4. The display device of claim 3, wherein, when viewing in a third direction orthogonal to an upper surface of the substrate, the first and second common pads are inside the first and second protective pads, respectively.

5. The display device of claim 3, further comprising:
   a printed circuit board at an opposite side of the display layer with reference to the substrate; and
   an additional element on the printed circuit board,
   wherein the additional element comprises at least one of a light-emitting element and an antenna element, and when viewing in a third direction orthogonal to an upper surface of the substrate, the additional element is between the first and second protective pads.

6. The display device of claim 5, wherein the first protruding substrate is disposed between the first conductive via and the printed circuit board; and
   the second protruding substrate is disposed between the second conductive via and the printed circuit board,
   wherein the additional element is exposed between the first and second protruding substrates.

7. The display device of claim 3, further comprising:
   a housing,
   wherein the substrate, the driving layer, the display layer, the protective layer, the first protective pad, the second protective pad, the first conductive via, the second conductive via, and the driving chip are arranged in the housing, and the housing comprises a first window overlapping the display layer in a third direction orthogonal to an upper surface of the substrate.

8. The display device of claim 7, further comprising:
   a printed circuit board at an opposite side of the display layer with reference to the substrate; and
   a light-emitting element on the printed circuit board,
   wherein the printed circuit board and the light-emitting element are arranged in the housing, and the housing further comprises a second window overlapping the light-emitting element in the third direction.

9. The display device of claim further comprising a sealing membrane extending on the substrate along an edge of the protective layer, an edge of the first protective pad, and an edge of the second protective pad.

10. The display device of claim 9, wherein a side surface of the sealing membrane extends in a third direction orthogonal to an upper surface of the substrate.

11. The display device of claim 9, wherein, when viewing in a third direction orthogonal to an upper surface of the substrate, a distance between the side surface of the sealing membrane and the protective layer is gradually less from the upper surface of the substrate.

12. The display device of claim 9, wherein the sealing membrane forms a single layer with the protective layer, the first protective pad, and the second protective pad.

13. The display device of claim 1, wherein the first common pad is on any one of both end portions of the first reference side surface arranged at opposite sides in the second direction.

14. The display device of claim 1, wherein the first common pad is in a region between both end portions of the first reference side surface arranged at opposite sides in the second direction.

\* \* \* \* \*